(12) United States Patent
Serikawa et al.

(10) Patent No.: US 6,348,143 B1
(45) Date of Patent: Feb. 19, 2002

(54) HYDROTHERMAL ELECTROLYSIS METHOD AND APPARATUS

(75) Inventors: Roberto Masahiro Serikawa; Qingquan Su; Akira Watanabe, all of Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/485,519
(22) PCT Filed: Aug. 10, 1998
(86) PCT No.: PCT/JP98/03544
§ 371 Date: Feb. 11, 2000
§ 102(e) Date: Feb. 11, 2000
(87) PCT Pub. No.: WO99/07641
PCT Pub. Date: Feb. 18, 1999

(30) Foreign Application Priority Data

Aug. 11, 1997 (JP) ............................................. 9-216826
Jan. 27, 1998 (JP) ........................................... 10-013995

(51) Int. Cl.⁷ ................................................. C02F 1/461
(52) U.S. Cl. ...................... 205/687; 205/688; 205/701; 205/742; 204/242
(58) Field of Search ................................ 205/687, 688, 205/701, 742; 204/242

(56) References Cited

U.S. PATENT DOCUMENTS

| 4,077,862 | A | | 3/1978 | Okazaki | ..................... 204/262 |
| 4,278,527 | A | | 7/1981 | Dotson | ........................ 204/272 |
| 4,389,288 | A | | 6/1983 | Vaughan | ..................... 204/101 |
| 4,405,420 | A | | 9/1983 | Vaughan | ..................... 204/105 |
| 4,692,232 | A | | 9/1987 | King | .......................... 204/278 |
| 4,752,364 | A | * | 6/1988 | Dhooge | ...................... 204/151 |
| 5,401,374 | A | | 3/1995 | Leutwyler | ................... 204/272 |

FOREIGN PATENT DOCUMENTS

| FR | 2 233 290 | 1/1975 |
| JP | 49-116858 | 11/1974 |
| JP | 50-003080 | 1/1975 |
| JP | 6-182344 | 7/1994 |

\* cited by examiner

*Primary Examiner*—Arun S. Phasge
(74) *Attorney, Agent, or Firm*—Wenderoth, Lind & Ponack, L.L.P.

(57) ABSTRACT

A method and apparatus for simultaneously performing hydrothermal reaction and electrolysis in the presence of a strongly acidic ion such as halide ions. A reactor internally has a pair of electrodes. An oxidizing agent such as an oxygen gas may be added. Even low-molecular weight compounds such as acetic acid and ammonia can be readily decomposed.

20 Claims, 20 Drawing Sheets

US 6,348,143 B1

HYDROTHERMAL ELECTROLYSIS METHOD AND APPARATUS

This application is a 371 of PCT/JP98/03544 filed Aug. 10, 1998.

FIELD OF THE INVENTION

The present invention relates to a method and an apparatus for simultaneously performing hydrothermal reaction and electrolysis. As used herein, hydrothermal electrolysis refers to performing hydrothermal reaction and electrolysis at the same time.

RELATED ART

Wastewaters containing organic matters or the like have been treated by hydrothermal reaction. The hydrothermal reaction refers to a reaction which proceeds by holding wastewater or the like at high temperatures under high pressures in the presence of water to decompose organic matters in the wastewater.

During hydrothermal reaction, wastewater its held at an elevated temperature of, for example, 100 to 350° C. for, typically, several tens of minutes. For continuous treatment, for example, pressurized wastewater is introduced into a reactor which has been heated so that the wastewater may retain at high temperatures under high pressures for a given period of time. For batch treatment or semi-continuous treatment including repeated batch treatments, wastewater in a pressure-resistant closed container is heated, and pressure is raised with the increasing temperatures.

It is also known to perform the hydrothermal reaction in the presence of an oxidizing agent such as oxygen or hydrogen peroxide for oxidatively decomposing organic matters or the like in wastewater. Such oxidative decomposition reaction is called hydrothermal oxidation reaction or wet oxidation process. In the hydrothermal oxidation reaction or wet oxidation process, compounds having low-molecular weights such as acetic acid or ammonia can not be readily decomposed, and the decomposition rate is limited. Thus, the presence of a heterogeneous catalyst for promoting oxidation reaction was proposed as described in JPB No. 19757/84. The wet oxidation process using a heterogeneous catalyst is also called as catalytic wet oxidation process. In this way, the chemical oxygen demand (COD) of wastewater can be lowered by hydrothermal reaction, which includes wet oxidation process and catalytic wet oxidation process.

Various wastewaters are treated by hydrothermal reaction or wet oxidation process. For example, influent wastewaters include a slurry obtained from organic wastes in a solid, sludge or liquid form such as municipal waste, night soil, sewage sludge and industrial waste. Organic sludge and various industrial wastewaters are also treated. Wastewaters contain various materials, and it is desirable to readily decompose any kind of materials therein.

However, metallic material used in the reactor rapidly corrodes when wastewaters containing salts were treated by the wet oxidation process or catalytic wet oxidation process. When salts were present in the order of percents, they sometimes act as catalyst poison in the catalytic wet oxidation process.

Wastewaters containing salts include, for example, industrial wastewaters, which often contain chloride ions. Contaminated wastewater from power plants sometimes contains 500 to 20,000 mg/L of sodium chloride together with ammonia or monoethanolamine. Leachates from municipal wastes landfill sometimes contain 1,000 to 30,000 mg/L of chloride ions together with COD components. It is not rare that wastewaters from chemical plants and food plants contain tens of thousands of mg/L of chloride ions. Even if these salts are not initially contained, halide ions may be generated in water when wastewaters or wastes containing halogenated organic compounds are treated by hydrothermal reaction.

Thus, special caution was needed to treat wastewaters containing salts such as halide ions. However, the present invention allows halide ions to involve in oxidative decomposition of reduced matters, and the presence thereof improves treatment of wastewaters.

SUMMARY OF THE INVENTION

Hydrothermal reaction requires high pressure, and therefore, it has commonly been performed in a closed container. When the internal pressure in the closed container increases above a determined value, a gas releases from an escape valve.

On the other hand, electrolysis in the presence of water generally leads to generation of a hydrogen gas and an an oxygen gas. The presence of the hydrogen gas and the oxygen gas may involve a danger of explosion.

Thus, electrolysis of wastewater in a closed container may mix the hydrogen gas with the oxygen gas to create a danger of explosion. Particularly, when the hydrothermal reaction and electrolysis are performed simultaneously, it would be expected that a mixed gas containing the hydrogen gas and the oxygen gas is brought to high temperatures under high pressures to further increase the force of the explosion.

However, we carefully performed hydrothermal reaction and electrolysis simultaneously in an aqueous solution containing a halide ion on a small scale. To our surprise, we have found that the generation of a hydrogen gas and an oxygen gas is highly suppressed at high temperatures and that reduced matters such as organic matters and ammonia therein are effectively decomposed by oxidation.

According to a first aspect of the present invention, a method for hydrothermal electrolysis is provided comprising the step of applying direct current to an aqueous medium containing water, a halide ion and a reduced matter at a temperature ranging from 100° C. to a critical temperature of the aqueous medium under a pressure for maintaining the aqueous medium in the liquid phase.

In the present invention, said aqueous medium preferably is held in a reactor having a metallic inner wall which serves as a cathode while an anode is placed inside of said reactor. When an aqueous medium containing a salt such as halide ions is hydrothermally decomposed, the reactor can be protected from corrosion by cathodic protection.

According to a second aspect of the present invention, an apparatus for hydrothermal electrolysis is provided comprising a reactor capable of withstanding a pressure of a hydrothermal reaction and a pair of electrodes for electrolyzing a matter in the reactor.

According to a third aspect of the present invention, a method for hydrothermal electrolysis is provided comprising the step of applying direct current to an aqueous medium containing water, a strongly acidic ion and a reduced matter at a temperature ranging from 100° C. to a critical temperature of the aqueous medium under a pressure for maintaining the aqueous medium in the liquid phase.

PREFERRED EMBODIMENTS OF THE INVENTION

Figure 1:
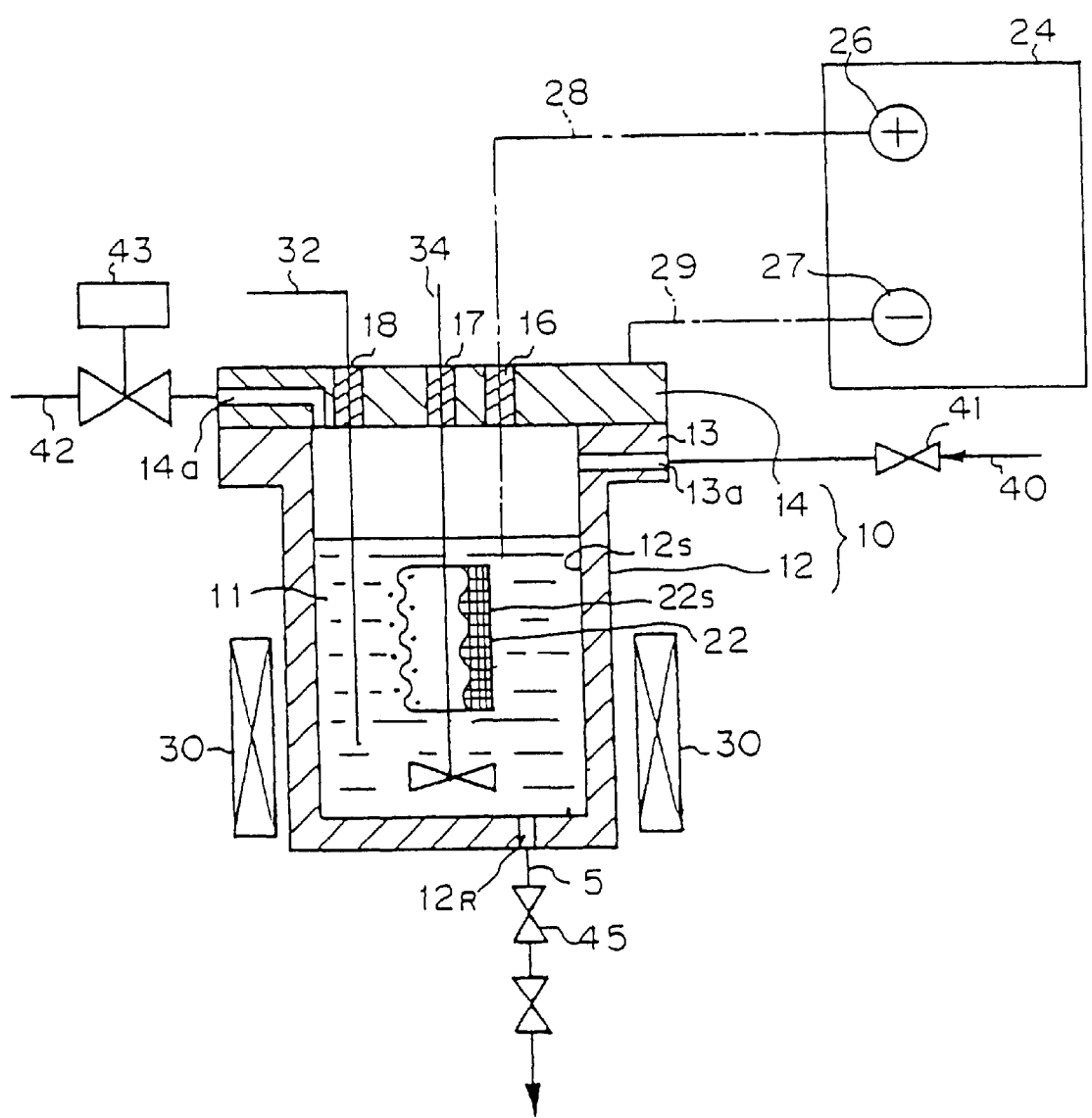
FIG. 1 shows a hydrothermal electrolysis apparatus according to one embodiment of the present invention.

According to the present invention, an aqueous medium containing water, a halide ion such as chloride ion and a reduced matter such as organic matters, ammonia and so on is electrolyzed at a given high temperature under high pressure to oxidatively decompose the reduced matter. During electrolysis, oxidation reaction proceeds at the anode to generate an oxygen gas and a halogenous oxidizing agent such as hypohalous acids. In the presence of the oxidizing agent such as the oxygen gas at high temperatures under high pressure of the hydrothermal reaction, oxidation reaction tends to readily proceed. The present invention allows the reduced matter such as organic matters and ammonia to effectively decompose by performing hydrothermal reaction and electrolysis simultaneously.

The electrode reactions which can proceed in hydrothermal electrolysis of the present invention are described below. At the anode, the following reactions (1), (2) and (3) seem to proceed:

$$2X^- \rightarrow X_2 + 2e^- \qquad (1)$$

wherein X represents a chlorine atom, a bromine atom, an iodine atom or any combination thereof.

$$H_2O \rightarrow 2H + 1/2O_2\uparrow + 2e^- \qquad (2)$$

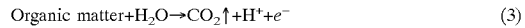

$$\text{Organic matter} + H_2O \rightarrow CO_2\uparrow + H^+ + e^- \qquad (3)$$

In formula (1), the halide ion is oxidized to generate a halogen molecule. If X is a chlorine atom, for example, a chlorine gas is generated. In formula (2), water is electrolyzed to generate an oxygen gas. In formula (3), an organic matter is directly oxidized at the anode. The reactions of formulae (1) and (2) compete with each other, and which reaction prevails depends on the type of the anode, the halide ion content in the aqueous medium or the like. If the halide ion content is a given level or more when a chlorine-generating electrode is used, for example, the reaction of formula (1) can preferentially proceeds.

The halogen molecule generated at the interface between the anode and the electrolyte according to formula (1) reacts with water in its vicinity to generate a hypohalous acid and a hydrogen halide.

$$X_2 + H_2O \rightarrow HX + HXO \qquad (4)$$

wherein X has the same meaning as above.

The hypohalous acid is an excellent oxidizing agent, which can oxidatively decompose the reduced matter contained in the aqueous medium. If the reduced matter is an organic matter, for example, the organic matter seems to be oxidized via the following reaction.

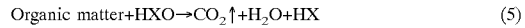

$$\text{Organic matter} + HXO \rightarrow CO_2\uparrow + H_2O + HX \qquad (5)$$

wherein X has the same meaning as above.

If the reduced matter is ammonia, the ammonia seems to be oxidized via the following reaction.

$$2NH_3 + 3HXO > N_2\uparrow + 3HX + 3H_2O \qquad (6)$$

The hypohalous acid is an excellent oxidizing agent especially in acidic solutions, and surroundings of the anode in which the hypohalous acid is generated tend to be acidic because hydrogen ions are generated according to formulae (2), (3), (4) or the like. Therefore, the hypohalous acid is more likely to act as an oxidizing agent especially in the vicinity of the anode.

When X is a chlorine atom, it appears that the oxidation reaction with the hypohalous acid especially involves in the decomposition of the reduced matter.

When X is a bromine atom or an iodine atom, however, the halate ion may involve in the decomposition of the reduced matter. A hypohalite ion disproportionates in a basic solution to generate a halate ion and a halide ion.

$$3XO^- \rightarrow 2X^- + XO_3^- \tag{7}$$

If the hypohalous acid moves to the neighborhood of the cathode by diffusion or the like, the reaction of formula (7) might occur because a cathodic reaction produces hydroxide ions, and therefore, the neighborhood of the cathode tends to be basic. The rate of the disproportionation reaction of formula (7) increases in the order of chlorine, bromine and iodine so that the halate ion can be quantitatively obtained in case of bromine and iodine (F. A. Cotton, G. Wilkinson, P. L. Gauss, "Basic Inorganic Chemistry", Baifukan Publishers, the 2nd edition, 1991, p. 379). The halate is a strong acid and a strong oxidizing agent.

In formula (2), water is electrolyzed to generate an oxygen gas. Here, this nascent oxygen seem to be initially generated at the interface between the anode and the electrolyte. Such nascent oxygen is more active as an oxidizing agent than molecular oxygen (an oxygen gas) to efficiently oxidize the reduced matter. Even if oxygen molecules are generated, the reduced matter can be oxidized by hydrothermal oxidation reaction.

When the reduced matter is an organic matter, the following oxidation reaction by oxygen may proceed.

$$\text{Organic matter} + O_2 \rightarrow CO_2\uparrow + H_2O \tag{8}$$

The reduced matter such as organic matters, ammonia and so on may be sometimes directly oxidized at the anode by the electrode reaction as shown in formula (3). When the reduced matter is ammonia, for example, the following reaction may proceed.

$$2NH_3 \rightarrow N_2\uparrow + 6H^+ + 6e^- \tag{9}$$

Thus, hydrothermal electrolysis of the present invention may include many reaction mechanisms through which the reduced matter is efficiently decomposed by oxidation at or near the anode.

On the other hand, following reactions may occur at the cathode.

Water is electrolyzed to generate hydrogen at the cathode.

$$2H_2O + 2e^- \rightarrow H_2\uparrow + 2OH^- \tag{10}$$

Here, the reactor body may be used as a cathode to allow so-called cathodic protection.

A reaction may also proceed in which an oxidizing agent is reduced at the cathode. Here, the oxidizing agent includes those generated at the anode such as hypohalous acids and those externally added as demanded. Examples of such a reaction are shown in the following formulae (11), (12) and (13).

A hypohalous acid may be reduced at the cathode.

$$HXO + e^- \rightarrow X^- + OH^- \tag{11}$$

Dissolved oxygen in the aqueous medium (as represented by $O_{2(aq.)}$ in the following formula) can be also reduced.

$$1/2 O_{2(aq.)} + H_2O + 2e^- \rightarrow 2OH^- \tag{12}$$

If hydrogen peroxide is present, the hydrogen peroxide also can be reduced at the cathode.

$$H_2O_2 + 2e^- \rightarrow 2OH^- \tag{13}$$

At the cathode, the reactions of formulae (11), (12) and (13) that the oxidizers are reduced may compete with the reaction of formula (10) that hydrogen is generated.

Our experiments revealed that, in the hydrothermal electrolysis, the reactions of formulae (11), (12), (13) or the like that the oxidizers are reduced preferentially proceed than the reaction that hydrogen is generated. Thus, the hydrothermal electrolysis suppresses generation of hydrogen so that the possibility of presence of an oxygen gas and a hydrogen gas in the reactor at the same time reduces, thereby decreasing the danger of explosion. Moreover, the oxidizing agent such as hypohalous acids is decomposed at the cathode, and therefore, any secondary treatment for making the oxidizing agent in a resultant, treated water innocuous is unnecessary. During electrolysis at room temperature, for example, hypohalite ions are generated at a high concentration. However, almost no detectable hypohalite ions were generated during electrolysis at high temperatures.

Whatever the reaction mechanisms are, according to the present invention, the reduced matter such as organic matters, ammonia and so on can be decomposed by oxidation and the generation of a hydrogen gas and an oxygen gas is highly suppressed.

Halide ions used in the present invention include a chloride ion ($Cl^-$), a bromide ion ($Br^-$), an iodide ion ($I^-$) or any combination thereof, among which the chloride ion or the bromide ion is especially preferred. A salt for producing a halide ion may be dissolved in the aqueous medium. Alternatively, the aqueous medium may contain an acid such as hydrogen chloride (HCl), hydrogen bromide (HBr), hydrogen iodide (HI) or the like.

The salt for producing a halide ion may be either an inorganic or organic salt. For example, preferably used are salts of an acid such as hydrogen chloride (HCl), hydrogen bromide (HBr) and hydrogen iodide (HI) with a base. Inorganic salts include, for example, alkali metal halides such as sodium chloride, potassium chloride; alkali earth metal halides such as calcium chloride; ammonium halides such as ammonium chloride; complex salts such as tris (ethylenediamine)cobalt (III) chloride, tris(2,2'-bipyridine) iron (II) bromide. Organic salts may be tetraalkylammonium halides such as tetraethylammonium chloride. Addition salts of an amine with a hydrogen halide (for example, aniline-hydrogen chloride) or the like are also suitable. Wastewaters derived from municipal waste or chlorine-containing polymers such as polyvinyl chloride or polyvinylidene chloride contain an overwhelmingly amount of chloride ions compared with other halide ions.

The aqueous medium preferably contains 0.05 mmol/L or more of halide ions, more preferably 0.5 mmol/L or more of halide ions, still more preferably 5 mmol/L or more of halide ions, because halide ions produce hypohalous acids by the electrolysis of the aqueous medium so that the hypohalous acids may oxidize the reduced matter in the aqueous medium.

The aqueous medium preferably contains 0.05 mmol/L or more of chloride ions ($Cl^-$), more preferably 0.5 mmol/L or more of chloride ions, still more preferably 5 mmol/L or more of chloride ions.

The reduced matter which can be decomposed by the present invention may be a compound which is oxidized with an OX$^-$ ion wherein X represents a chlorine atom, a bromine atom, an iodine atom or any combination thereof. Alternatively, the reduced matter may be a compound which is oxidized with an oxidizing agent such as an oxygen gas in the presence of water at a temperature of 100° C. or more but not higher than the critical temperature of the aqueous medium. The reduced matter may be either organic or inorganic.

Organic matters which can be decomposed by the present invention include aliphatic and aromatic hydrocarbons such as alkane, alkene, alkyne; alcohols; aldehydes; ketones; amines; carboxylic acids such as acetic acid; carboxylate derivatives such as esters, amides, acid anhydrides; halogenated hydrocarbons; phenols; sulfur-containing compounds such as sulfoxides, mercaptans, thiols, polysulfons.

Both aliphatic and aromatic hydrocarbons can be decomposed by oxidation. Decomposable aliphatic hydrocarbons are not limited to lower alkanes such as methane or ethane and lower alkylenes such as ethylene, but also include polymers such as polyethylene and polypropylene.

Decomposable aromatic hydrocarbons include, for example, benzene, naphthalene, azulene, anthracene, pyrene or the like. Synthetic polymers such as polyphenylene oxide or polyallylate are also decomposable.

Nitrogen-containing heterocyclic rings such as pyrrole, pyridine, indole, benzimidazole; oxygen-containing heterocyclic rings such as furan, tetrahydrofuran, benzopyran; and sulfur-containing heterocyclic rings such as thiophene are also decomposable. Synthetic polymers containing these heterocyclic rings in their monomer unit such as phenol resins are also decomposable.

Said alcohols include not only lower alcohols such as methanol or ethanol but also polyvinyl alcohol. Monosaccharides such as glucose, fructose; disaccharides; oligosaccharides; and polysaccharides such as cellulose are also included.

Said amines are typically decomposable into a nitrogen gas and water through ammonia. These amines include aliphatic amines such as alkyl amines and aromatic amines such as aniline.

Synthetic polymers containing a nitrogen atom such as urea resins, melamine resins and polyurethane resins are also decomposable.

Compounds having two or more functional groups are also decomposable. For example, compounds having a hydroxyl group and an amino group such as ethanolamine are decomposable. Compounds having a carboxyl group (—COOH) and an amino group such as amino acid are also decomposable. Hydrolyzable compounds such as proteins, polysaccharides and polyesters are also decomposable. Such polyesters include, for example, nylon, polyallylate, unsaturated polyester resins or the like.

Halogenated hydrocarbons are typically decomposed into a hydrogen halide such as chlorine, carbon dioxide and water. Preferably, a base is preliminarily added to the aqueous medium to neutralize the resulting hydrogen halide. Such a base includes, but not specifically limited to, sodium hydroxide, potassium hydroxide or the like. Said halogenated hydrocarbons include, for example, aliphatic compounds having a halogen atom such as trihalomethanes such as chloroform, trichlorofluoromethane, tetrachloromethane, dichloromethane, dichloroethane; and aromatic compounds having a halogen atom such as chlorophenol, polychlorobiphenyl (PCB) and dioxins.

Said organic compounds substituted with a functional group containing a silicon atom such as a trimethylsilyl group can also be decomposed by oxidation.

Sulfur-containing compounds such as phosphate derivatives are also decomposable. Such phosphate derivatives include, for example, malathion represented by the chemical formula: $(CH_3)_2P(=S)—S—CH(CO_2C_2H_5)(CH_2CO_2C_2H_5)$. Malathion is a cholinesterase inhibitor similarly to the following cholinesterase inhibitors which are also decomposable by the present invention:

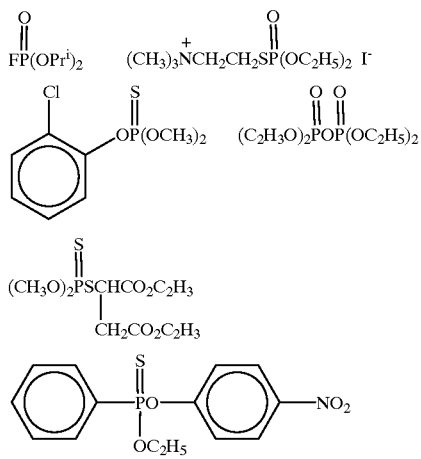

Phospholipids are also decomposable.

Inorganic matters which are decomposable by the present invention include, for example, ammonia; nitrate ion, nitrite ion; cyanogen compounds such as sodium cyanide; inorganic nitrogen sources such as urea. Ammonia is decomposed into nitrogen gas through nitrate ion. Nitrate ion and nitrite ion are decomposed by cathodic reaction at high temperatures. Cyano ion ($CN^-$) is hydrolyzed to generate formic acid and an ammonium salt. Then, formic acid and ammonium ion can be further decomposed into carbon dioxide, a nitrogen gas and water. Optionally, a base such as sodium hydroxide, potassium hydroxide and so on may be added for decomposing cyano compounds. Sulfur compounds such as hydrogen sulfide may be oxidized also.

Nitrogen sources such as ammonia, nitrate ion, nitrite ion and amines, which lead to eutrophication, should be eliminated below the regulated discharge level.

In the present invention, an "aqueous medium" is electrolyzed. This "aqueous medium" may be any of a suspension, an emulsion and an aqueous solution. A reduced matter in liquid or solid may be mixed in the aqueous medium. Thus, the "aqueous medium" includes a suspension that non-precipitating solid particles are dispersed in water, an emulsion that liquid particles are dispersed in water, a solution that organic or inorganic matters in liquid are dissolved in water, and any mixture thereof. The "aqueous medium" comprises a continuous phase containing water, liquid organic matters and dissolved salts; a discontinuous phase containing combustible particles such as tar and pitch, and optionally a non-combustible solid such as ash.

In the present invention, the hydrothermal reaction takes place at a temperature of 100° C. or more but not higher than the critical temperature of the aqueous medium under a pressure at which the aqueous medium maintains liquid phase. Any temperature below 100° C. is not preferable because the rate of hydrothermal reaction decreases to extend the reaction time. At temperatures above the critical temperature, however, physical properties of the aqueous medium markedly change so that the finding of the present invention can not be readily applied but additional experiments are required. At supercritical temperatures, for example, the solubility the electrolyte such as halide ions or the like greatly reduces to decrease the electric conductivity.

In the present invention, the temperature is preferably 120° C. or more but 370° C. or less, more preferably 140° C. or more but 370° C. or less.

Figure 3:
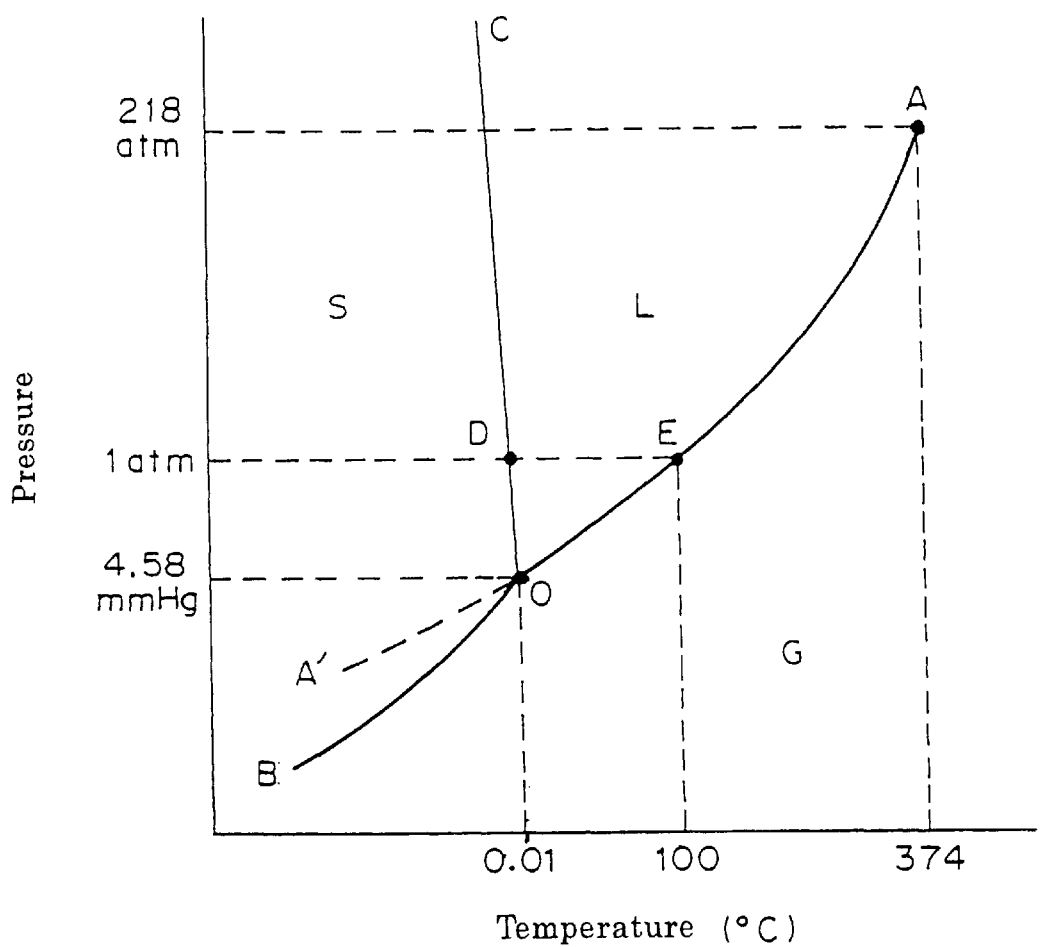
FIG. 3 shows a state diagram of pure water.

FIG. 3 shows a state diagram of pure water, wherein solid, liquid and gas phases are represented by S, L and G, respectively. Curve OA is a vapor pressure curve showing changes in vapor pressure of liquid depending on temperatures. At temperatures and pressures above curve OA, the liquid phase is maintained. Namely, the liquid phase is maintained under a pressure that is higher than the vapor pressure at a temperature of 100° C. or more but not higher than the critical temperature. It should be understood that the vapor pressure curve of an aqueous media is different from that of pure water since the aqueous medium may contain a halide ion and a reduced matter.

Curve OA ends at critical point A, and the temperature, pressure and molar volume at the critical point are called as critical temperature, critical pressure and critical volume, respectively. They are collectively called as critical constants, which are specific to each material. At the critical point, molar volumes of gas and liquid are equal. Above the critical temperature or critical pressure, a gas cannot be differentiated from a liquid to form a fluid called as a supercritical fluid. For example, pure water has a critical temperature of 374° C. and a critical pressure of 218 atm.

The present invention preferably further comprises the step of adding an oxidizing agent to the aqueous medium. The oxidizing agent may be added in the aqueous medium in a reactor. Alternatively, the oxidizing agent may be added to the aqueous medium, which may be then introduced into a reactor. The presence of an oxidizing agent in hydrothermal electrolysis can suppress generation of hydrogen at the cathode. Namely, a reduction reaction of the oxidizing agent seems to prevail over a reaction for generating hydrogen. Moreover, the presence of the oxidizing agent may reduce an electric power needed for electrolysis compared to the case that the oxidizing agent is absent.

The externally added oxidizing agent preferably includes an oxygen gas, an ozone gas, hydrogen peroxide, a hypohalous acid, and more preferably an oxygen gas. A gas containing the oxygen gas, preferably air may be used as the oxygen gas.

The amount of the oxidizing agent externally added by the present invention preferably corresponds to 0.01 to 100 equivalents of the chemical oxygen demand of the aqueous medium. If the oxidizing agent is present at a content below 0.01 equivalent, the chemical oxygen demand of the aqueous medium can not be sufficiently lowered and a higher electric power is needed for electrolysis. If the oxidizing agent exceeds 100 equivalents, an excessive amount of the oxidizing agent will be wasted over the amount required for oxidation of the reduced matter in the aqueous medium. Thus, the amount of the oxidizing agent added to reduce the chemical oxygen demand of the aqueous medium is preferably 10 equivalents or less, more preferably 5 equivalents or less, still more preferably 2 equivalents or less of the chemical oxygen demand of the aqueous medium.

The chemical oxygen demand here measures the oxygen equivalent of organic matters in a sample. For example, a sample of an aqueous medium is refluxed with a known amount of potassium dichromate in sulfuric acid for 2 hours. Before reflux, silver sulfate is added to oxidize straight chain compounds, and silver sulfide is added to prevent oxidation of chloride ions. The COD of the aqueous medium can be determined by titrating unreacted potassium dichromate against a standard of ammonium iron sulfate.

FIG. 1 shows a hydrothermal electrolysis apparatus according to one embodiment of the present invention, which is suitable for a batch treatment.

The hydrothermal electrolysis apparatus has a reactor 10 capable of resisting the pressure of hydrothermal reaction, and said reactor has a body 12 capable of holding an aqueous medium 11 and a cover 14. A flange 13 may be formed at an upper portion of the body 12. The flange 13 of the body 12 and an end of the cover 14 can be fixed to each other with a fastener not shown, such as a bolt and a nut. The reactor 10 may be, for example, an autoclave. The reactor 10 can resist the pressure of hydrothermal reaction to form a closed space.

A pair of electrodes for electrolysis are provided in the reactor 10. The body 12 of the reactor 10 has a metallic inner wall 12s, which can serve as a cathode. For example, as shown in FIG. 1, the body 12 may be wholly made of a metal. In this case, the inner wall 12s of the body 12 can be protected against corrosion. If a cathode were formed separately from the body 12, the inner wall 12s of the body 12 would be vulnerable to corrosion from halide ions such as chloride ion under the conditions of high temperature under high pressure of the hydrothermal reaction.

The body 12 can be made of, for example, nickel-based alloys such as Hastelloy, Inconel, Incoloy; titanium-based alloys; steels such as carbon steel, stainless steel. However, the inner wall 12s of the body 12 may be coated with a coating layer of any metal such as platinum, which serves as a cathode.

An anode 22 is placed within the body 12 of the reactor 10. The shape of the anode is not limited as principle.

In the present invention, the distance between the anode and the cathode is preferably constant. If the distance varies, an excessive current may locally flow in the area where the distance therebetween is narrow to accelerate deterioration of the anode in the area. In the present invention, the inner wall 12s of the body 12 preferably has a cylindrical shape. Preferably, the outer face 22s of the anode 22 also has a cylindrical shape so that the center axis of the anode 22 substantially coincides with the center axis of the inner wall 12s of the body 12.

The anode 22 may be formed of a mesh or a net or a plate in a cylindrical shape.

The electrode serving as an anode preferably has a surface having ruthenium, iridium, platinum, palladium, rhodium, tin or an oxide thereof or ferrite. For example, the electrode itself may be formed from these materials. Alternatively, the base material of the electrode may be covered with these materials on its surface.

Ruthenium, iridium, platinum, palladium, rhodium and tin may exist as metal elements per se or oxides thereof. Alloys of these metals may also be preferably used. Such alloys include, for example, platinum-iridium, ruthenium-tin, ruthenium-titanium. Said metals have excellent corrosion resistance and excellent insolubility when used as an anode, and efficiently generate halogen molecules such as chlorine gas. Particularly, the electrode for generating chlorine is preferably based on palladium, ruthenium or an alloy of platinum with iridium.

A positive terminal 26 and a negative terminal 27 of a dc source 24 are connected to the anode 22 and cathode 12s via lines 28, 29, respectively. The line 28 for providing electricity with the anode is inserted into the reactor 10 and insulated with an insulating member 16 from the reactor 10. When the body 12 and the cover 14 are metallic, the line 29 may be connected to the body 12 or cover 14. For example, ac current may be converted into dc current with a full-wave rectifier comprising a diode, condenser, resistor or the like.

In FIG. 1, a gas line 40 is provided to pressurize the inside of the reactor 10. The gas line 40 communicates with the inside of the reactor 10 via a through-hole 13a formed in the flange 13. For example, the gas line 40 may have a compressor not shown. A valve 41 may be opened to pressurize the inside of the reactor 10.

The reactor 10 is heated with a heating device 30. The heating device may be, for example, an electric heater or a silicone oil or other bath. If the reactor is a tower, it may be externally heated with a burner or the like.

The hydrothermal electrolysis apparatus preferably has a thermocouple 32 for measuring the temperature of the aqueous medium 11. The thermocouple may be formed from, for example, a chromel-alumel alloy or a platinum alloy. In FIG. 1, the cover 14 of the reactor 10 has an insulating member 18 through which the thermocouple 32 passes. The thermocouple 32 may directly pass through the cover 14 without providing the insulating member 18. A temperature control mechanism for controlling the heating device 30 on the basis of the value of the thermocouple 32 may be provided.

Preferably, the aqueous medium 11 is appropriately stirred with a stirring device 34. The stirring device 34 may have a shaft which coincides with the center axis of the reactor 10, for example.

The hydrothermal electrolysis apparatus preferably has a discharge line 42 having a pressure-control valve 43. The discharge line 42 communicates with the inside of the reactor 10 through a through-hole 14a formed in the cover 14. When hydrothermal reaction should be terminated, the pressure-control valve 43 may be opened to discharge a gas through the discharge line 42 for decreasing the inner pressure of the reactor 10 to the atmospheric pressure. When the inner pressure of the reactor 10 rises above a determined value, the pressure-control valve 43 may be opened to release a gas to for decreasing the inner pressure.

The hydrothermal electrolysis apparatus preferably has a discharge line 44 for discharging a resultant, treated water. The discharge line 44 communicates with the inside of the reactor 10 via a through-hole 12R formed in the bottom of the body 12. A valve 45 on the discharge line 44 may be opened to remove a resultant, treated water.

A hydrothermal electrolysis process using the hydrothermal electrolysis apparatus shown in FIG. 1 is explained as follows.

The aqueous medium described above is introduced into the body 12 of the reactor 10 at room temperature under atmospheric pressure. The aqueous medium preferably contains an oxidizing agent. The oxidizing agent can repress generation of hydrogen during electrolysis of the aqueous medium to reduce the possibility of explosion and save the electric power needed for electrolysis.

For batch treatment, the volume of the aqueous medium introduced into the reactor 10 is preferably 75% or less, ore preferably 65% or less of the volume of the inner space of the reactor 10. Thus, a space remains within the reactor 10 for introducing a gas or receiving a gas generated by hydrothermal electrolysis. The volume of the aqueous medium introduced into the reactor 10 is preferably 10% or more, more preferably 25% or more of the volume of the inner space of the reactor 10. If the volume of the aqueous medium is less than 10%, only a limited amount of the aqueous medium can be treated at once to lower the efficiency. However, such a volume of the aqueous medium does not apply to the continuous hydrothermal electrolysis shown in FIG. 2.

The anode 22 is placed in the body 12. The distance between the anode 22 and the body 12 is preferably constant as possible. Then, the flange 13 of the body 12 and the cover 14 are fixed to each other with a fastener not shown to close the inside of the reactor 10.

The valve 41 is opened to introduce a gas into the reactor 10 via the gas line 40. Preferably, the reactor 10 is preliminarily pressurized at room temperature so that it assumes a pressure at which the aqueous medium can be maintained in the liquid phase at the heating temperature. A gas introduced via the gas line 40 is preferably an inert gas such as nitrogen gas, an argon gas. When a hydrogen gas generates, the gas introduced decreases a partial pressure of the hydrogen gas for reducing the danger of explosion.

Subsequently, the reactor 10 is heated to a prescribed temperature with the heating device 30. Preferably, the temperature in the reactor 10 is monitored.

After the prescribed temperature has been reached, current is applied across the anode 22 and the body 12 of the reactor serving as a cathode from the dc source 24. Thus, the aqueous medium is electrolyzed whereby the reduced matter in the aqueous medium is oxidatively decomposed.

The dc source 24 preferably has a constant current rather than a constant voltage. As electrolysis in the aqueous medium proceeds, the electrical resistance of the aqueous medium varies with various factors. The amount of gas generated or the like can be more easily controlled when the current is constant. Moreover, the voltage necessary for applying a constant current can be monitored to know deposition of scale within the reactor.

In the process of the present invention, the current density at the anode is preferably $0.1$ $mA/dm^2$ to $500$ $A/dm^2$. If the current density exceeds $500$ $A/dm^2$, the surface of the anode may be readily stripped or dissoluted. If the current density is lower than $0.1$ $mA/dm^2$, the anode must have a large area, leading to a bulky system. The current density is more preferably $10$ $mA/dm^2$ to $100$ $A/dm^2$, still more preferably $10$ $mA/dm^2$ to $50$ $A/dm^2$. If a novel material for anode were developed, the current density of the anode could be higher.

When dc is supplied for a given period of time, scale may occur on the surface of the cathode, i.e. the inner wall 12s of the body 12 of the reactor 10. Scale seems to result from precipitation of a salt such as calcium carbonate. The electrical resistance increases with appearance of scale. When a constant dc is supplied, for example, the voltage increases. Thus, the anode and the cathode are inverted for dc supply once a determined electric resistance has been reached. The inner wall 12s of the body 12 of the reactor 10 now serves as anode to generate hydrogen ions, which make the reactor locally acidic. In the presence of a strong acid, calcium carbonate releases a weak acid carbonic acid ($H_2CO_3$) and dissolves. Thus, scale such as calcium carbonate can be dissolved.

$$CaCO_3 + H^+ \text{(strong acid)} \rightarrow Ca^{2+} + HCO_3^- \qquad (14)$$

In the embodiment where the electrodes are inverted, a corrosion-resistant material is preferably used for the reactor 10.

Then, heating with the heating device 30 and electric supply from the dc source 24 may be terminated simultaneously. The reactor 10 may be cooled preferably to room temperature. During then, the reactor 10 may be aerated to accelerate the cooling rate.

The pressure-control valve 43 is opened to lower the inner pressure of the reactor 10. Then, the valve 45 is preferably opened to discharge the treated aqueous medium 11 via the line 45.

Figure 2:
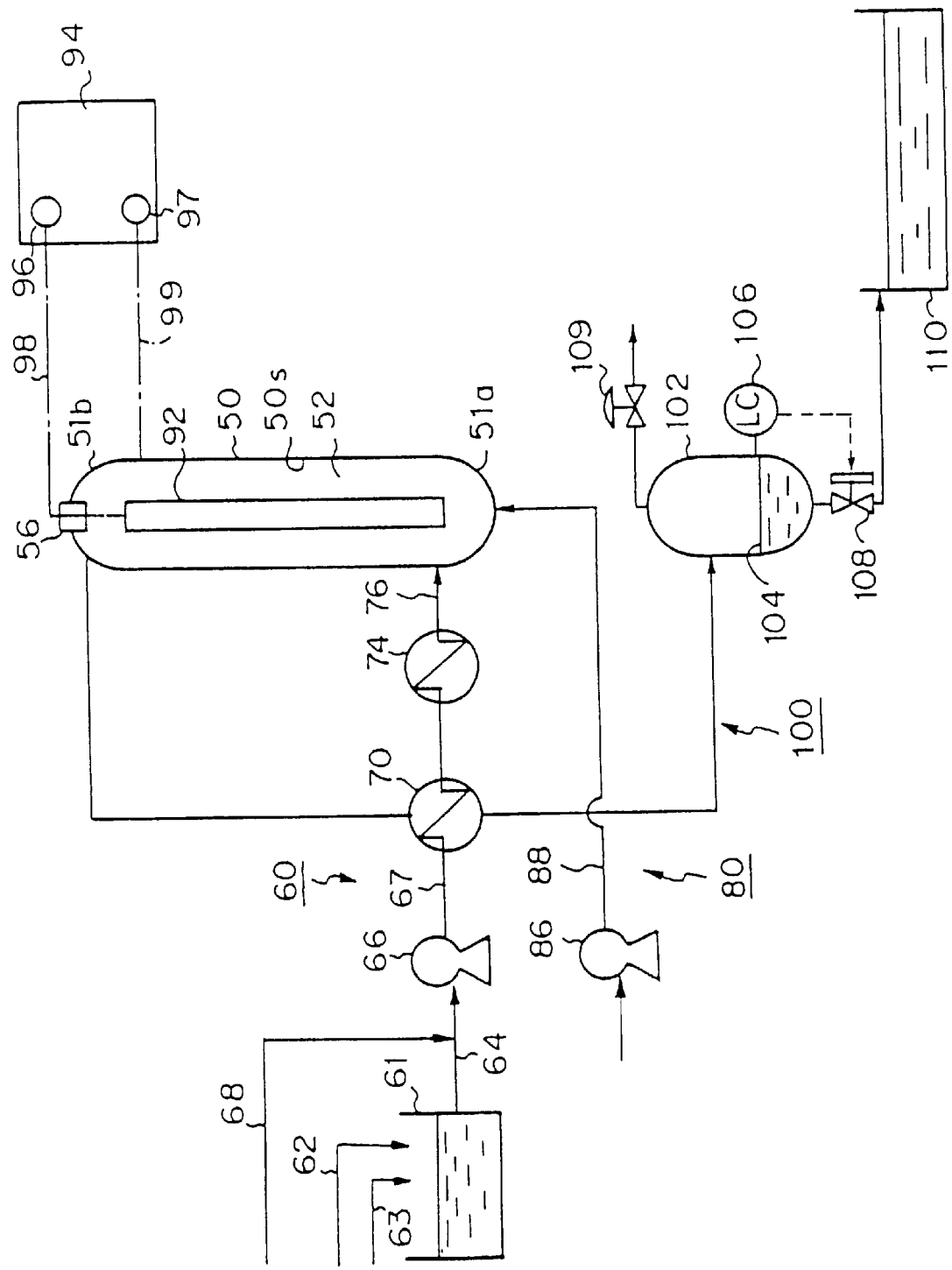
FIG. 2 shows a hydrothermal electrolysis apparatus according to another embodiment of the present invention.

FIG. 2 shows a hydrothermal electrolysis apparatus according to another embodiment of the present invention. This hydrothermal electrolysis apparatus is suitable for continuous treatment.

The hydrothermal electrolysis apparatus has a reactor 50 which can resist the pressure of hydrothermal reaction. The inside of the reactor 50 can be kept at high temperatures under high pressures so that hydrothermal reaction of an aqueous medium can proceed. The aqueous medium 52 is electrolyzed as it moves from a lower portion 51a of the reactor 50 to an upper portion 51b.

In FIG. 2, an aqueous medium line 60 for feeding the aqueous medium is connected to the reactor 50. The aqueous medium line 60 preferably has a feed tank 61, a high-pressure pump 66, a heat exchanger 70 and a heating device 74, and the aqueous medium can circulate in this order.

The feed tank 61 can hold the aqueous medium. A wastewater line 62 for introducing wastewater into the feed tank 61 and a halide line 63 for feeding a halide ion source such as chloride ion ($Cl^-$) to the feed tank 61 are connected to the feed tank 61. The halide ion source may be seawater. The halide line 63 can feed a halide ion such as chloride ion to the feed tank 61 to control the halide ion content in the aqueous medium held in the feed tank 61.

The feed tank 61 is connected to the high-pressure pump 66 via the line 64 to transfer the aqueous medium. Preferably, a tap water line 68 for feeding tap water is connected to the line 64. Thus, tap water substantially free from reduced matters can be temporally circulated when the hydrothermal electrolysis apparatus of FIG. 2 is started up or terminated.

The high-pressure pump 66 pressurizes the aqueous medium to a pressure required for hydrothermal reaction to force the aqueous medium into the reactor 50 via the heat exchanger 70 and heating device 74.

Preferably, the aqueous medium line 60 has the heat exchanger 70. The heat exchanger 70 is connected to the aqueous medium line 60 and a discharge line 100 to exchange heat between the aqueous medium circulating through the aqueous medium line 60 and the treated water circulating through the discharge line 100. The aqueous medium pressurized by the high-pressure pump 66 is often at room temperature. However, the treated water 52 discharged from the reactor 50 remains at a high temperature via hydrothermal reaction. Thus, the heat exchanger 70 heats up the aqueous medium circulating through the aqueous medium line 60 while cooling the treated water circulating through the discharge line 100. Even the absence of the heat exchanger only results in lowered heat efficiency.

Preferably, the aqueous medium line 60 has the heating device 74 for further heating the aqueous medium heated by the heat exchanger 70, because heat loss tends to increase if the aqueous medium 52 within the reactor 50 is heated from the outside of the reactor 50. The heating device 74 heats the aqueous medium to, for example, a temperature required for hydrothermal reaction. The temperature to which the aqueous medium is heated should be set considering heat evolution due to oxidative reaction of the reduced matter and heat evolution due to electrolysis. A heating device for heating the outside of the reactor 50 may be further added.

Preferably, an oxidizing agent line 80 is provided separately from the aqueous medium line 60. The oxidizing agent includes,.for example, a gas containing an oxygen gas, such as air. For example, high-pressure air may be directly introduced into the reactor 50 via a compressor 86 on the oxidizing agent line 80.

Alternatively, a liquid in which an oxygen gas is dissolved, such as water, may be introduced into the reactor 50. Gaseous oxidizers such as an oxygen gas (which may be added as air) are more readily soluble in water as the temperature becomes lower or the pressure becomes higher. Thus, a gaseous oxidizing agent may be dissolved in water at a low temperature or room temperature under a high pressure and then this cold water may be fed to the reactor. Alternatively, aqueous hydrogen peroxide, hypochlorous acid or a solid oxidizing agent dissolved in water may be fed to the reactor via a high-pressure pump or the like.

Preferably, the oxidizing agent line 80 is directly connected to the reactor 50. If the oxidizing agent line 80 were connected to the aqueous medium line 60, the line 76 between the heating device 74 and the reactor 50 would be vulnerable to corrosion. If an oxidizing agent is directly introduced into the reactor 50 when the inner wall of the reactor 50 serves as a cathode for electrolysis, however, the inner wall of the reactor 50 can be protected from corrosion.

The reactor 50 preferably has an axially extending sleeve shape, preferably a cylindrical shape.

A pair of electrodes for electrolysis are provided within the reactor 50. The reactor 50 has a metallic inner wall 50s, which can serve as a cathode. For example, the wall of the reactor 50 may be wholly made from a metal.

Similarly to FIG. 1, the distance between the anode and the cathode is preferably constant. Also preferably, the inner wall 50s of the reactor 50 has a cylindrical shape as well as the outer face of the anode 92 so that the center axis of the anode 92 substantially coincides with the center axis of the reactor 50. The materials for the reactor 50 and anode 92 are as described about FIG. 1.

A positive terminal 96 and a negative terminal 97 of a dc source 94 are connected to the anode 92 and the cathode 50s via lines 98, 99, respectively. The line 98 for providing electricity with the anode passes through the upper portion 51b of the reactor 50 and the line 98 is insulated with an insulating member 56 from the reactor 50. If the reactor 50 is metallic, the line 99 may be directly connected to the reactor 50. The dc source is similar to that of the hydrothermal electrolysis apparatus of FIG. 1.

In FIG. 2, the discharge line 100 for discharging the aqueous medium hydrothermally electrolyzed is connected to the reactor 50. The discharge line 100 preferably has a heat exchanger 70, a gas-liquid separator 102 and a treated water tank 110, so that the effluent hydrothermally decomposed in the reactor 50 may be transferred in this order. The heat exchanger 70 has already been explained.

Preferably, the gas-liquid separator 102 is connected to the discharge line 100. The gas-liquid separator 102 separates gas and liquid in treated water. Treated water is held in the gas-liquid separator 102 to a determined level 104. A lead pipe may be provided between the space above this level 104 and the treated water below this level 104, and said lead pipe may have a level detector to determine the gas-liquid interface or slurry level. A level-detecting mechanism 106 may determine the level 104 from pressure difference between gas and liquid to control the discharged amount of treated water so that this level 104 may be fixed or within a fixed range. A piezoelectric device for transducing pressure into electric signals may be each provided above and below the level 104 in the gas-liquid separator 102 so that the electric signal are entered into a level detector to detect pressure difference.

Preferably, the gas-liquid separator 102 has a level-control mechanism 106 for controlling the level of the aqueous medium in the gas-liquid separator 102 within a fixed range. Said level-control mechanism may have a level detector for detecting pressure difference between gas and the aqueous medium, a valve for discharging the aqueous medium and a controller for controlling the valve by signals from the level detector. The level-control mechanism may have a lead pipe or a piezoelectric device.

A valve 108 is connected to the gas-liquid separator 102 so that treated water within the gas-liquid separator 102 can be discharged into the container 110 when the valve 108 is opened. Preferably, the valve 108 is controlled to open and close by signals from the level-control mechanism 106.

The gas-liquid separator 102 may have a pressure-control mechanism for controlling the pressure in the gas-liquid separator within a fixed range. Said pressure-control mechanism may have, for example, a pressure detector for detecting the pressure of gas phase, a valve for discharging gas and a controller for controlling the valve by signals from the pressure detector. For example, the pressure-control mechanism controls the pressure within the range from the lowest pressure at which the aqueous medium maintains the liquid phase to the highest pressure at which the reactor 50 and gas-liquid separator 102 can be safely operated. The pressure detector may have a piezoelectric device.

A valve 109 is connected to the gas-liquid separator 102 to release gas within the gas-liquid separator 102 to atmosphere when the valve 109 is opened. Preferably, the valve 109 is controlled to open and close by signals from a pressure-control mechanism not shown.

Then, a hydrothermal electrolysis process using the hydrothermal electrolysis apparatus of FIG. 2 is explained as follows.

At first, start-up is explained. Assume that any liquid has not been introduced into the reactor 50. Tap water is first introduced into the aqueous medium line 60 from the tap water line 68 at room temperature under atmospheric pressure. The tap water is introduced into the reactor 50 through the heat exchanger 70 and heating device 76 by the action of the high-pressure pump 66. After the tap water has been introduced into the heating device 74, the heating device 74 is started up to heat the tap water. The heated tap water is discharged from the reactor 50 into the discharge line 100 and sent to the container 110 through the gas-liquid separator 102.

After the system has been stabilized, feed of tap water from the tap water line to the aqueous medium line 60 is terminated and feed of an aqueous medium from the feed tank 61 to the aqueous medium line 60 is started. The halide ion content in the aqueous medium or the like has preliminarily been controlled by the halide line 63 or the like. The aqueous medium is introduced into the reactor 50 while the aqueous medium is continuously heated by the heating device 74. An oxidizing agent is introduced into the reactor 50 via the oxidizing agent line 80.

After the aqueous medium and oxidizing agent have been introduced into the reactor 50, electrolysis is started. Namely, the dc source 94 is turned on to supply direct current to the anode 92 and the reactor 50 serving as a cathode. The aqueous medium maintained in the liquid phase at a high temperature under a high pressure moves from the bottom to the top of the reactor 50, during which hydrothermal reaction and electrolysis proceed simultaneously. The heating temperature by the heating device 74 is appropriately lowered because heat is generated as hydrothermal reaction and electrolysis proceed.

The reaction time should be sufficient for the reduced matter in the aqueous medium to be decomposed by oxidation, for example, 1 second to 48 hours, preferably 1 minute to 24 hours. The reaction time is more preferably 5 hours or less, still more preferably 2 hours or less. The reaction time is controlled depending on the volume of the reactor 50 and the circulating rate of the aqueous medium.

When the reaction is to be terminated, inflow from the feed tank 61 to the aqueous medium line 60 is terminated and tap water is introduced from the tap water line into the aqueous medium line 60. Introduction of the oxidizing agent from the oxidizing agent line 80 into the reactor 50 is also terminated. Then, the dc source is turned off to terminate electrolysis. Then, the power of the heating device 74 is lowered to gradually lower the temperature of the aqueous medium flowing in the reactor 50.

In the present invention, hydrothermal electrolysis may also be performed on an aqueous medium containing water, an electrolytic component and a reduced matter. The electrolytic component is not limited to a halide ion, but also may be an anion such as hydroxide ion ($OH^-$), sulfate ion ($SO_4^{2-}$), nitrate ion ($NO_3^-$), or a cation such as hydrogen ion ($H^+$), alkali metal ions such as sodium ion or alkali earth metal ions. In the presence of these electrolytic components, the aqueous medium acts as an electrolyte for electrolysis. During electrolysis, an oxidizing agent such as an oxygen gas is generated at the anode to oxidatively decompose the reduced matter. The reduced matter can be decomposed by oxidation better when hydrothermal reaction and electrolysis take place simultaneously than hydrothermal reaction alone.

The aqueous medium preferably contains 0.1 mmol/L or more, more preferably 1 mmol/L or more, still more preferably 10 mmol/L or more of the electrolytic component. For example, an aqueous sodium chloride solution at 0.05 mmol/L contains 0.1 mmol/L of an electrolytic component consisting of 0.05 mmol of sodium ion and 0.05 mmol of chloride ion.

In the present invention, hydrothermal electrolysis may also be performed on an aqueous medium containing water, a strongly acidic ion and a reduced matter.

The strongly acidic ion is preferably an ion corresponding to a strong acid having a dissociation constant (pK) at 25° C. of 3.5 or less, more preferably 2.5 or less. The acid corresponding to the strongly acidic ion is preferably protonic.

The strongly acidic ion may be an inorganic acid ion or an organic acid ion. However, the strong acid is preferably an inorganic acid ion, because organic acid ions are sometimes decomposed as hydrothermal electrolysis proceeds.

Inorganic strongly acidic ions include, for example, halide ions, sulfate ion ($SO_4^{2-}$), nitrate ion ($NO_3^-$) and phosphate ion ($PO_4^{3-}$). Organic strongly acidic ions include, for example, trifluoroacetate ion ($CF_3COO^-$) or the like.

The strongly acidic ion may exist as an acid or a salt. The salt may be formed with an inorganic cation such as alkali metal ions, alkali earth metal ions, or an organic cation.

EXAMPLES

In the following examples and Comparative Examples, the autoclave 10 shown in FIG. 1 was used. The inner volume was 300 ml, and the body 12 and cover 14 were made from SUS304 stainless steel unless otherwise specified.

In the following examples and Comparative Examples, the gaseous composition in the autoclave after hydrothermal reaction was analyzed with a gas chromatograph equipped with a TCD detector. Analysis of $H_2$, $O_2$, $CO_2$ and CO was performed at a current of the TCD detector of 60 mA. Analysis of $Cl_2$ gas was performed with a detecting tube. In the following tables, nd means not detected.

Total organic carbon (TOC) in treated water after hydrothermal reaction was determined with a TOC analyzer. TOC decomposition rate was calculated according to the following equation.

$$TOC \text{ decomposition rate} = \{1-(TOC \text{ of treated water}/TOC \text{ of feed water})\} \times 100 \qquad (15)$$

Free chlorine contents in treated water were determined by the DPD method. Analysis of ammonia nitrogen and nitrate nitrogen was performed with an autoanalyzer available from BRAN+LUEBEE.

Example 1

Examples 1 to 6 and Comparative Examples 1 to 3 relate to experiments on acetic acid. Tables 1 and 2 show experimental conditions and results of Examples 1 to 6 and Comparative Examples 1 to 3, respectively.

TABLE 1

|  |  | Ex. 1 | Ex. 2 | Ex. 3 | Ex. 4 | Ex. 5 | Ex. 6 |
|---|---|---|---|---|---|---|---|
| Reaction conditions | Feed water volume (mL) | 150 | 150 | 150 | 150 | 150 | 150 |
|  | Feed water acetic acid content (mg/L) | 5,000 | 5,000 | 5,000 | 5,000 | 5,000 | 5,000 |
|  | Feed water NaCl content (wt %) | 2 | 2 | 2 | 2 | 2 | 2 |
|  | Feed water $H_2O_2$ content (wt %) | 0 | 0 | 0 | 0 | 1.5 | 4.5 |
|  | Initial Ar pressure (MPa) | 3 | 3 | 3 | 3 | 3 | 3 |
|  | Initial $O_2$ Pressure (MPa) | 0 | 0 | 0 | 0 | 0 | 0 |
|  | Reaction temperature (° C.) | 150 | 150 | 250 | 250 | 250 | 250 |
|  | Average reaction pressure (MPa) | 3.3 | 2.8 | 5.9 | 6 | 6.6 | 7.4 |
|  | Reaction time (min) | 60 | 60 | 60 | 60 | 60 | 60 |
|  | Anode type | Ru | Pt | Ru | Ru | Ru | Ru |
|  | Electrolytic current (A) | 2 | 2 | 2 | 6 | 2 | 2 |
|  | Average electrolytic voltage (V) | 3.8 | 3.2 | 2.9 | 3.2 | 2.9 | 2.8 |
| Gaseous Product (gas Composition in the reactor) | H2 (vol %) | 21.0 | 20.0 | 22.1 | 22.7 | 0.2 | 0.2 |
|  | O2 (vol %) | 1.0 | 0.7 | nd | nd | 2.9 | 24.3 |
|  | $CO_2$ (vol %) | 5.7 | 5.7 | 7.0 | 10.5 | 13.8 | 9.5 |
|  | CO (vol %) | 0.1 | 0.1 | 0.1 | 0.2 | nd | nd |
|  | Cl2 (ppm) | nd | nd | nd | nd | nd | nd |
| Effluent water quality | Feed water TOC (mg/L) | 2000 | 2000 | 2000 | 2000 | 2000 | 2000 |
|  | Effluent TOC (mg/L) | 838 | 768 | 658 | 87 | 73 | 63 |
|  | TOC decomposition rate (%) | 58.1 | 61.6 | 67.1 | 95.7 | 96.4 | 96.9 |
|  | Effluent free chlorine (mg/L) | 3 | 1 | nd | nd | nd | nd |

TABLE 2

|  |  | Comp. ex. 1 | Comp. ex. 2 | Comp. ex. 3 |
|---|---|---|---|---|
| Reaction conditions | Feed water volume (mL) | 150 | 150 | 150 |
|  | Feed water acetic acid content (mg/L) | 5,000 | 5,000 | 5,000 |
|  | Feed water NaCl content (wt %) | 2 | 2 | 2 |
|  | Feed water $H_2O_2$ content (wt %) | 0 | 4.5 | 0 |
|  | Initial Ar pressure (MPa) | 2 | 3 | 2 |
|  | Initial $O_2$ Pressure (MPa) | 1 | 0 | 1 |
|  | Reaction temperature (° C.) | 250 | 250 | 250 |
|  | Average reaction pressure (MPa) | 6.2 | 5.9 | 6.3 |
|  | Reaction time (min) | 120 | 120 | 120 |
|  | Anode type | none | Ru | Ru |
|  | Electrolytic current (A) | 0 | 0 | 0 |
|  | Average electrolytic voltage (V) | 0 | 0 | 0 |
| Gaseous Product | $H_2$ (vol %) | nd | nd | nd |
|  | $O_2$ (vol %) | 30.0 | 16.0 | 14.6 |
|  | $CO_2$ (vol %) | 2.44 | 2.8 | 5.6 |
|  | CO (vol %) | nd | nd | nd |
|  | $Cl_2$ (ppm) | nd | nd | nd |
| Effluent Water quality | Feed water TOC (mg/L) | 2000 | 2000 | 2000 |
|  | Effluent TOC (mg/L) | 1850 | 1794 | 1260 |
|  | TOC decomposition rate (%) | 7.5 | 10.3 | 37.0 |
|  | Effluent free chlorine (mg/L) | nd | nd | nd |

In the autoclave 10 having an inner volume of 300 mL shown in FIG. 1 were added 150 mL of feed water having an acetic acid content of 5,000 mg/L, then 3 g of NaCl at room temperature under atmospheric pressure. Then, a cylindrical ruthenium calcined electrode (outer diameter 25 mm, height 30 mm, thickness 0.5 mm) was placed at the center of the autoclave, which was then closed. Subsequently, 3 MPa of argon gas was introduced into the autoclave at room temperature under atmospheric pressure.

Then, the autoclave was heated with an electric heater until the temperature in the autoclave reached 150° C., at which it was maintained for 60 minutes. Starting from the moment when the temperature in the autoclave reached 150° C., electrolysis was continued for 60 minutes. Namely, supply of 2 A dc was started across the ruthenium calcined electrode serving as anode and the autoclave body serving as a cathode at that moment.

After current supply at the autoclave temperature of 150° C. for 60 minutes, the heater and dc supply were terminated simultaneously. Then, the autoclave was air-cooled with a fan. After reaction, treated water was clear and no corrosion was found in the autoclave.

Table 1 shows that hydrothermal electrolysis in Example 1 gave a TOC decomposition rate 7.6, 5.6 and 1.5 times higher than those of Comparative Examples 1, 2 and 3, respectively, in which electrolysis did not take place, at a temperature lower by 100° C. with a half of the reaction time.

Example 2

The ruthenium calcined electrode of Example 1 was replaced with a cylindrical platinum plate electrode (outer diameter 25 mm, height 30 mm, thickness 0.7 mm). Other reaction conditions were the same as in Example 1. After reaction, treated water was clear and no corrosion was found in the autoclave.

Table 1 shows that hydrothermal electrolysis in Example 2, wherein temperatures are lower by 100° C. and the reaction time is half than those of Comparative Examples 1, 2, and 3, gave a TOC decomposition rate 8.2, 6 and 1.7 times higher than those of Comparative Examples 1, 2 and 3, respectively, wherein electrolysis did not take place.

Example 3

Reaction conditions were the same as in Example 1, except that the reaction temperature was 250° C. instead of 150° C. in Example 1. After reaction, treated water was clear and no corrosion was found in the autoclave.

Hydrothermal electrolysis in Example 3 gave a TOC decomposition rate 8.9, 6.5 and 1.8 times higher than those of Comparative Examples 1, 2 and 3, respectively, with a half of the reaction time.

Example 4

Reaction conditions were the same as in Example 1, except that the reaction temperature was 250° C. and dc was 6 A instead of 150° C. and 2 A in Example 1. After reaction, treated water was clear and no corrosion was found in the autoclave.

Hydrothermal electrolysis in Example 4 gave a TOC decomposition rate 12.8, 9.3 and 2.6 times higher than those of Comparative Examples 1, 2 and 3, respectively, in which electrolysis did not take place, with a half of the reaction time. An increase of dc from 2 A to 6 A gave a higher TOC decomposition rate than that of Example 3 with the same reaction time.

Example 5

Example 5 differs from Examples 1 to 4 in that hydrogen peroxide was added as an oxidizing agent.

A feed water was prepared by adding acetic acid and hydrogen peroxide to pure water at room temperature under atmospheric pressure such that the feed water has an acetic acid content of 5,000 mg/L and a hydrogen peroxide content of 1.5 wt %, and 150 mL of the feed water was added into the autoclave having an inner volume of 300 mL shown in FIG. 1. Then, 3 g of NaCl was added to the autoclave. Then, a cylindrical ruthenium calcined electrode (outer diameter 25 mm, height 30 mm, thickness 5 mm) was placed at the center in the autoclave, which was then closed. Then, 3 MPa of argon gas was introduced into the autoclave. Then, the autoclave was heated with an electric heater until the temperature in the autoclave reached 250° C. Starting from that moment (reaction time 0), hydrothermal electrolysis was continued at this temperature for 60 minutes. Starting from reaction time zero, 2 A dc was applied across the ruthenium calcined electrode in the autoclave serving as anode and the autoclave body serving as a cathode for 60 minutes. After supply of 2 A dc at the autoclave temperature of 250° C. for 60 minutes, the heater and dc supply were terminated simultaneously. Then, the autoclave was air-cooled with a fan. After reaction, treated water was clear and no corrosion was found in the autoclave.

Hydrothermal electrolysis in Example 5 gave a TOC decomposition rate 12.9, 9.4 and 2.6 times higher than those of Comparative Examples 1, 2 and 3, respectively, in which electrolysis did not take place, with a half of the reaction time.

In Example 5, the decomposition efficiency was 1.4 times higher than that of Example 3 in which hydrogen peroxide was not added (hydrothermal electrolysis at 250° C., 2 A), showing that hydrogen peroxide is effective as an auxiliary oxidizing agent.

In Example 5, generation of a hydrogen gas could be suppressed in contrast to Examples 1 to 4 in which 20.0 to 22.7 vol % of a hydrogen gas evolved. Hydrogen gas generation was reduced to 0.2 vol % in Example 5. Thus, the danger of explosion remarkably decreased.

Example 6

Conditions were the same as in Example 5 except that hydrogen peroxide content was 4.5%.

In Example 6, hydrogen gas generation was 0.2 vol %. Thus, generation of a hydrogen gas could be supressed similarly to Example 5. In Example 6, feed water contained hydrogen peroxide at a content 3 times higher than that of Example 5. An excessive oxidizing agent externally added remained as an oxygen gas in gas phase.

Comparative Example 1

In the autoclave having an inner volume of 300 mL shown in FIG. 1 were added 150 mL of feed water having an acetic acid content of 5,000 mg/L, then 3 g of NaCl at room temperature under atmospheric pressure, and the autoclave was closed. Then, 2 MPa of argon gas was introduced into the autoclave from an argon bomb followed by 1 MPa of an oxygen gas at room temperature under atmospheric pressure (a total of 3 MPa of gas was introduced). In Comparative Example 1, hydrothermal oxidation reaction was performed without placing the electrode shown in FIG. 1 in the autoclave. The autoclave was heated with an electric heater until the temperature in the autoclave reached 250° C. Starting from that moment (reaction time 0), hydrothermal oxidation was continued at this temperature for 120 minutes. After reaction for 120 minutes, the electric heater was terminated and the autoclave was air-cooled with a fan.

Treated water was light red-colored and the inner wall of the autoclave was found to be somewhat corroded.

In spite of wet oxidation reaction at 250° C. for 120 minutes, the TOC decomposition rate was as low as 7.5%, showing that acetic acid was very difficult to decompose by the hydrothermal oxidation process using oxygen as an oxidizing agent.

The oxygen gas used as an oxidizing agent was not insufficient in this Comparative Example 1. Of a total of 3 MPa of gas, 1 MPa of an oxygen gas was introduced before reaction. Namely, the oxygen gas content in gas phase in the autoclave before hydrothermal oxidation reaction was 33.3 vol %. After hydrothermal oxidation reaction, the oxygen content in the autoclave was 30.0 vol %, showing that enough oxygen still remained.

Comparative Example 2

Comparative Example 1 was modified by replacing the oxygen gas with hydrogen peroxide as an oxidizing agent and placing a ruthenium calcined electrode expectable of catalytic effects in the autoclave. Electrolysis was not performed also in this Comparative Example.

A feed water was prepared by adding acetic acid and hydrogen peroxide to pure water at room temperature under atmospheric pressure such that the feed water has an acetic acid content of 5,000 mg/L and a hydrogen peroxide content of 4.5 wt %, and 150 mL of the feed water was added into the autoclave having an inner volume of 300 mL shown in FIG. 1. Then, 3 g of NaCl was added to the autoclave. Then, a cylindrical ruthenium calcined electrode (outer diameter 25 mm, height 30 mm, thickness 5 mm) was placed at the center in the autoclave, which was then closed. Then, 3 MPa of argon gas was introduced into the autoclave. Although the ruthenium calcined electrode was placed, dc was not applied. Other conditions were similar to those of Comparative Example 1. In Comparative Example 2, hydrogen peroxide was used in an amount about 4 times the stoichiometric equivalent necessary for oxidatively decomposing acetic acid contained in feed water. After reaction, treated water was light red-colored and the inner wall of the autoclave appeared to be somewhat corroded. The TOC decomposition rate slightly increased to 10.3% from 7.5% in Comparative Example 1.

Comparative Example 3

In the autoclave having an inner volume of 300 mL shown in FIG. 1, were added 150 mL of feed water having an acetic acid content of 5,000 mg/L and 3 g of NaCl at room temperature under atmospheric pressure. Then, a cylindrical ruthenium calcined electrode similar to the one used in Comparative Example 2 (outer diameter 25 mm, height 30 mm) was placed at the center in the autoclave, which was then closed. Then, 2 MPa of argon gas was introduced into the autoclave from an argon bomb followed by 1 MPa of the oxygen gas at room temperature under atmospheric pressure (a total of 3 MPa of gas was introduced).

In Comparative Example 3, the ruthenium calcined electrode was placed but dc was not applied. Other conditions were similar to those of Comparative Example 1. In Comparative Example 3, catalytic effects of the ruthenium calcined electrode were found to exist and the TOC removal rate rose to 37.0% as compared with Comparative Examples 1 and 2. However, treated water was more strongly red-colored than in Comparative Examples 1 and 2. Corrosion in the autoclave clearly advanced as compared with Comparative Examples 1 and 2.

The reaction formulae of acetic acid in hydrothermal electrolysis are described below.

The reaction in which acetic acid is oxidized with electrolytically generated hypochlorous acid is as follows:

$$CH_3COOH + 4HOCl \rightarrow 2CO_2\uparrow + 2H_2O + 4HCl \quad (16)$$

The reaction in which an equivalent amount of hypochlorous acid is generated at the anode is as follows:

$$8Cl^- + 4H_2O \rightarrow 4HClO + 4HCl + 8\ e^- \quad (17)$$

The reaction in which hydrogen is generated at the cathode is as follows:

$$8H_2O + 8e^- \rightarrow 4H_2\uparrow + 8OH^- \quad (18)$$

By combining formulae (15), (16) and (17), the overall reaction of hydrothermal electrolysis of acetic acid with hypochlorous acid can be described as follows:

$$CH_3COOH + 2H_2O \rightarrow 2CO_2\uparrow + 4H_2\uparrow \quad (19)$$

Oxidative decomposition of acetic acid with electrolytically generated oxygen is similar to formula (19). According to formula (19), hydrogen is generated in an amount 2 times the amount of carbon dioxide gas. This is well consistent with the ratio between a hydrogen gas and carbon dioxide gas obtained in Example 4.

Oxidation reaction of acetic acid present in the aqueous medium with an externally added oxidizing agent (hydrogen peroxide, the oxygen gas), i.e. by the action other than electrolysis is as follows:

$$CH_3COOH + 4H_2O_2 \rightarrow 2CO_2\uparrow + 6H_2O \quad (20)$$

$$CH_3COOH + 2O_{2(Aq.)} \rightarrow 2CO_2\uparrow + 2H_2O \quad (21)$$

In formula (20), acetic acid is oxidatively decomposed with hydrogen peroxide into carbon dioxide gas and water. This reaction alone is very slow as will be explained in the examples. In formula (21), acetic acid is decomposed with oxygen dissolved in the aqueous medium into carbon dioxide gas and water. This reaction alone is also very slow.

Comparative Example 4

In Comparative Example 4, hydrothermal electrolysis was performed on an aqueous solution of sodium chloride free from reduced matters.

In the autoclave 10 having an inner volume of 300 mL shown in FIG. 1 were added 150 mL of tap water, then 4 g of NaCl at room temperature under atmospheric pressure. Then, a cylindrical ruthenium calcined electrode (outer diameter 25 mm, height 30 mm, thickness 0.5 mm) was placed at the center of the autoclave, which was then closed. Subsequently, 3 MPa of argon gas was introduced into the autoclave at room temperature under atmospheric pressure.

Then, the autoclave was heated with an electric heater until the temperature in the autoclave reached a given temperature in the range from 30° C. to 350° C., at which it was maintained for a given period of time in the range from 15 to 60 minutes. Starting from the moment when the given temperature was reached, 2 A dc was supplied to continue electrolysis for a given period of time. The heater and dc supply were terminated simultaneously, and the autoclave was air-cooled with a fan.

Tables 3, 4 and 5 show hydrogen content (vol %), oxygen content (vol %) and free chlorine content in treated water (mg/l), respectively.

TABLE 3

| Hydrogen content | Temperature (° C.) | | | | | | | |
|---|---|---|---|---|---|---|---|---|
| time (min) | 30 | 50 | 100 | 150 | 200 | 250 | 300 | 350 |
| 0 | 0 | 0 | 0 | 0 | 0 | 0 | 0 | 0 |
| 15 | 2.2 | 1.55 | 1.18 | 0.94 | 1.01 | 0.8 | 0.7 | 0.7 |
| 30.2 | 5.02 | 3.42 | 2.31 | 2 | 1.36 | 0.95 | 0.7 | 0.7 |
| 45 | 7.56 | 4.95 | 4 | 3 | 1.44 | 1.07 | 0.8 | 0.8 |
| 60 | 8.87 | 6.55 | 5.48 | 3.9 | 1.51 | 1.2 | 0.8 | 0.8 |

TABLE 4

| Oxygen content | Temperature (° C.) | | | | | | | |
|---|---|---|---|---|---|---|---|---|
| time (min) | 30 | 50 | 100 | 150 | 200 | 250 | 300 | 350 |
| 0 | 0 | 0 | 0 | 0 | 0 | 0 | 0 | 0 |
| 15 | 0 | 0.27 | 0.29 | 0.86 | 0.48 | 0.16 | 0.05 | 0 |
| 30 | 0.68 | 0.81 | 0.911 | 1.63 | 0.64 | 0.15 | 0.04 | 0 |
| 45 | 1.15 | 1.3 | 1.58 | 2.01 | 0.66 | 0.122 | 0.02 | 0 |
| 60 | 1.88 | 2.07 | 2.46 | 2.2 | 0.68 | 0.02 | 0.01 | 0 |

TABLE 5

| Free chlorine | Temperature (° C.) | | | | | | | |
|---|---|---|---|---|---|---|---|---|
| time (min) | 30 | 50 | 100 | 150 | 200 | 250 | 300 | 350 |
| 0 | 0 | 0 | 0 | 0 | 0 | 0 | 0 | 0 |
| 15 | 1280 | 1110 | 210 | 41 | 9 | 0.75 | 0.1 | 0 |
| 30.2 | 2240 | 1970 | 480 | 38 | 14.75 | 1.25 | 0.1 | 0 |
| 45 | 3600 | 2040 | 490 | 37 | 19 | 1.75 | 0 | 0 |
| 60 | 3880 | 2200 | 460 | 45 | 10 | 1.25 | 0 | 0 |

Figure 4:
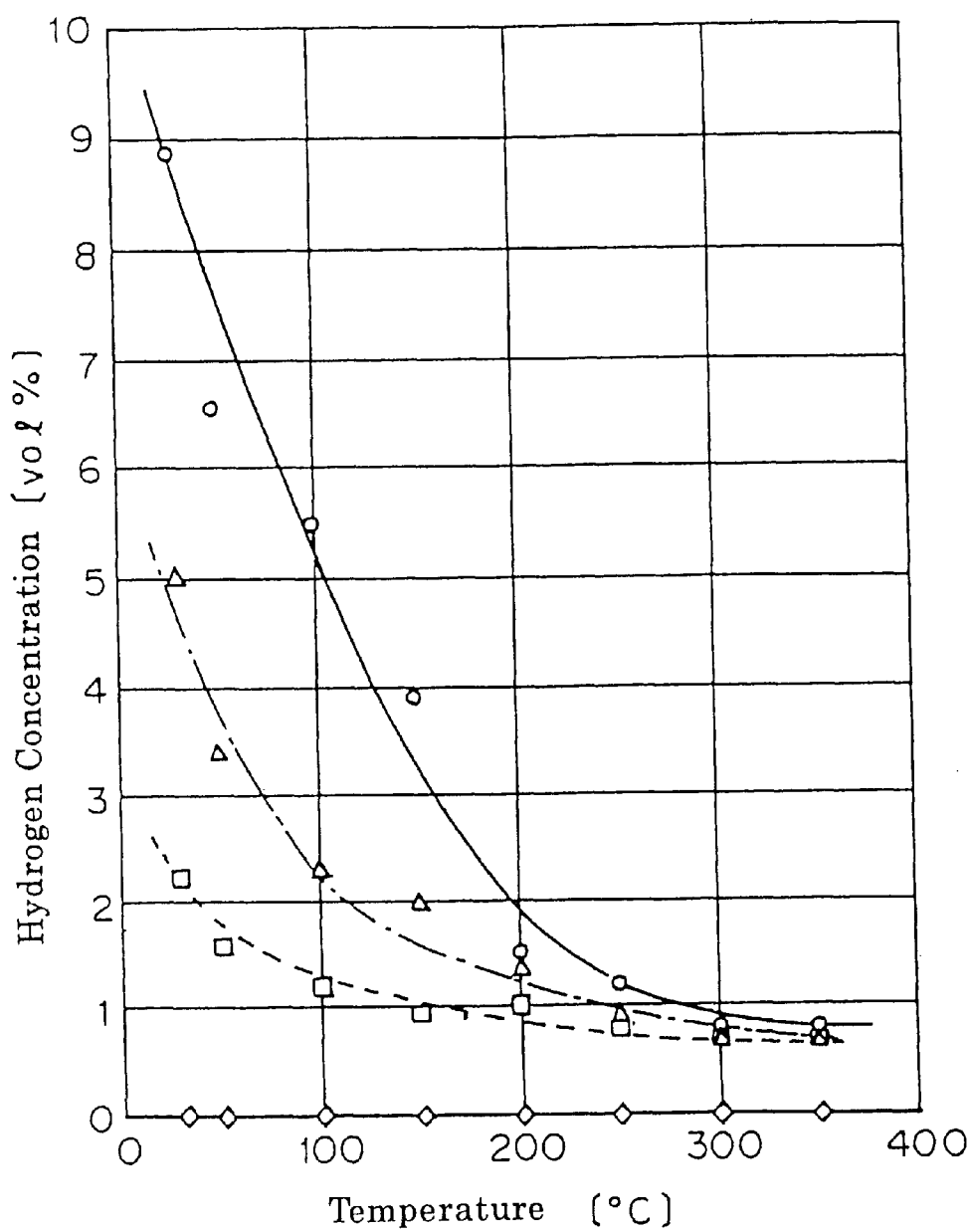
FIG. 4 is a graph showing the correlation of a hydrogen gas generated with reaction temperature concerning hydrothermal electrolysis of an aqueous solution of sodium chloride being free from reduced matters.
Figure 5:
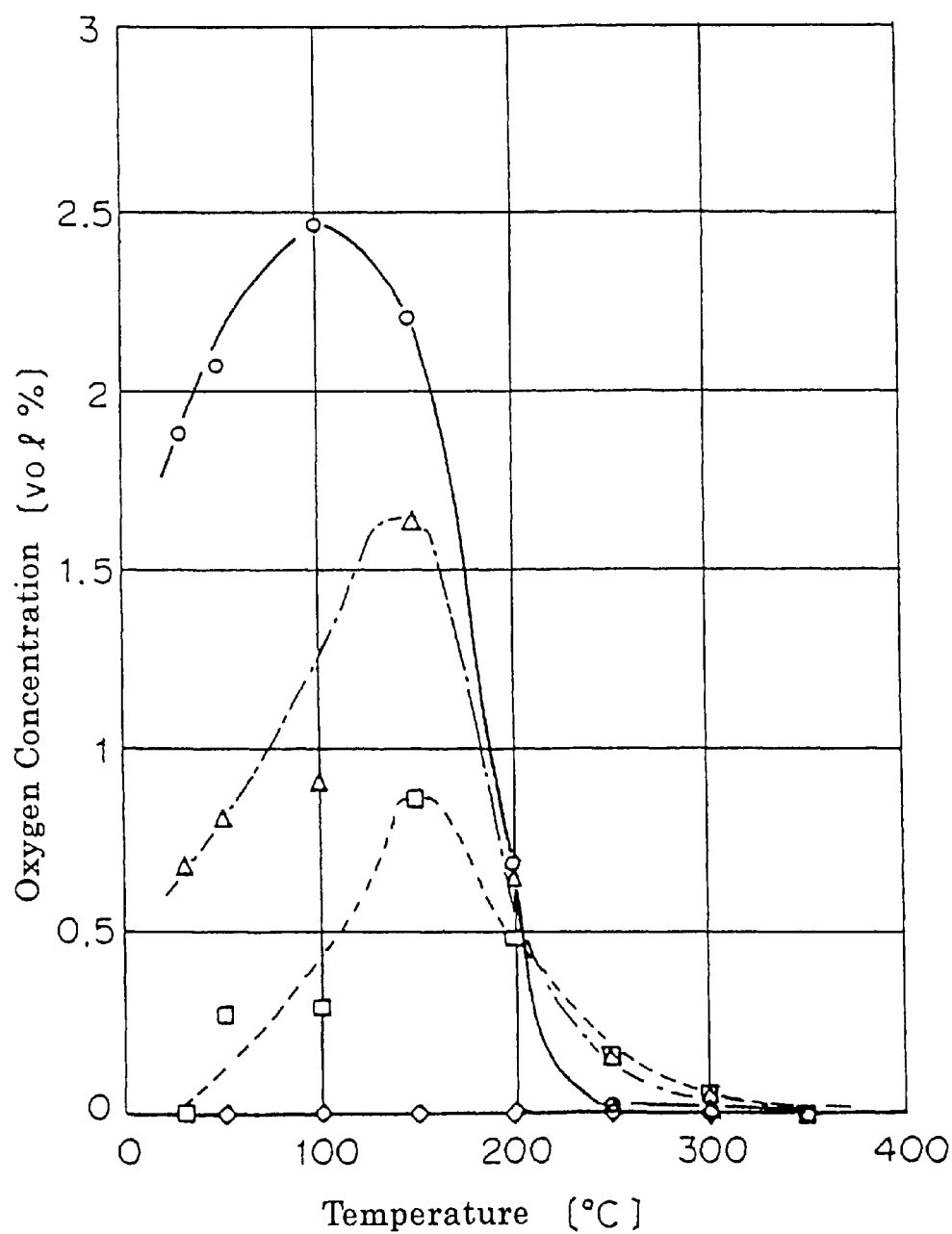
FIG. 5 is a graph showing the correlation of an oxygen gas generated with reaction temperature concerning hydrothermal electrolysis of an aqueous solution of sodium chloride being free from reduced matters.
Figure 6:
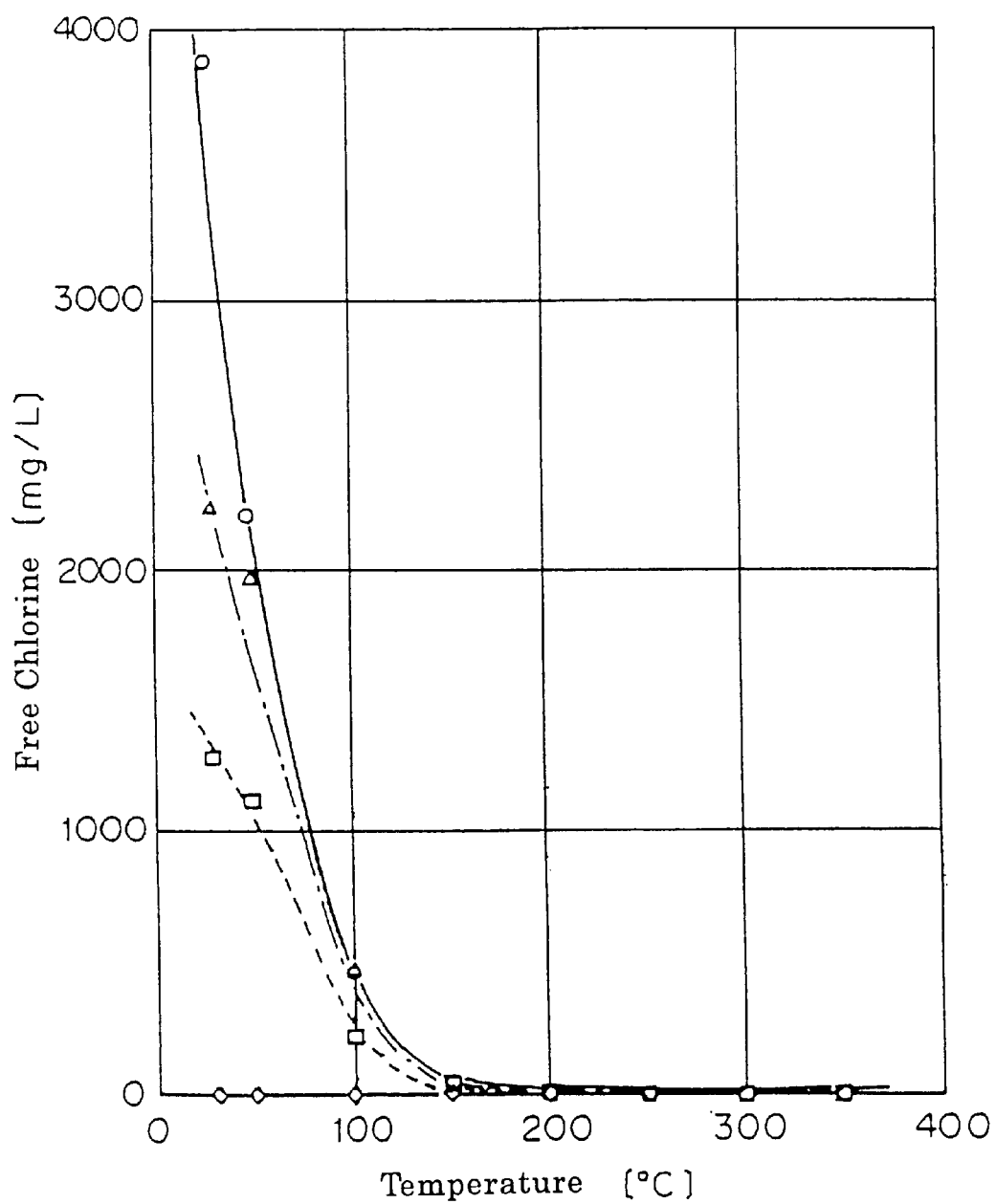
FIG. 6 is a graph showing the correlation of the free chlorine content in a resultant, treated water with reaction temperature concerning hydrothermal electrolysis of an aqueous solution of sodium chloride free from reduced matters.

Data in Tables 3, 4 and 5 were plotted as graphs in FIGS. 4, 5 and 6.

Tables 3 and 4 as well as FIGS. 4 and 5 show that generation of a hydrogen gas and an oxygen gas is suppressed as the reaction temperature rises. As the reaction temperature rises, free chlorine content decreases, indicating that hypochlorous acid may probably reduced to chlorine ion via cathodic reaction shown in reaction formula (11).

In other words, even though hydrothermal electrolysis takes place in the absence of reduced matter, generation of a hydrogen gas and an oxygen gas is suppressed so that danger of explosion can be avoided. Moreover, excessive hypochlorous acid ions may be consumed via cathodic reaction so that no hypochlorous acid, which may require the secondary treatment, remains in the treated water.

When an aqueous medium is treated by hydrothermal electrolysis according to the present invention, as the reaction proceeds, the reduced matter is oxidized so that no reduced matter remains in the aqueous medium. Even if hydrothermal electrolysis is further carried out in this state, safety can be ensured. Any excessive oxidizing agent is reduced at the cathode to suppress generation of hydrogen.

Figure 7:
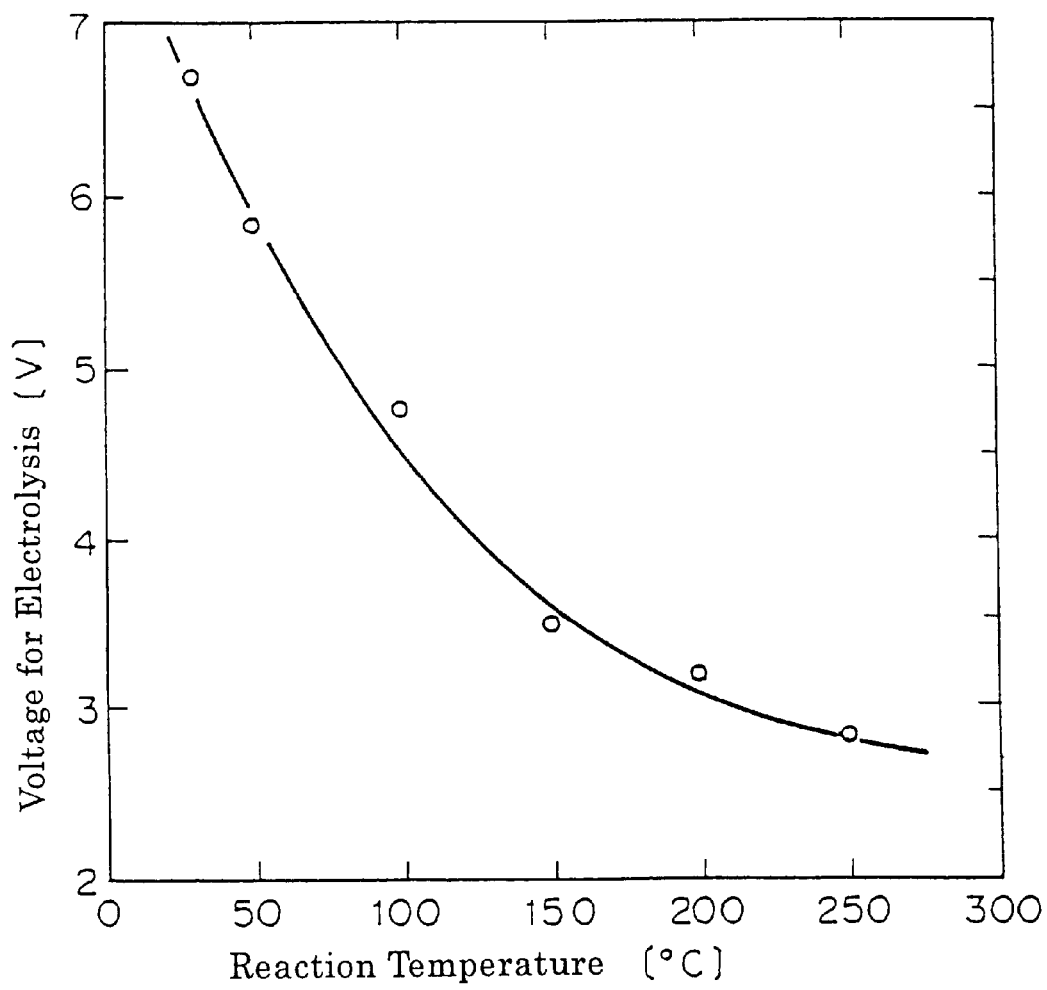
FIG. 7 is a graph showing the correlation of voltage with reaction temperature concerning hydrothermal electrolysis of an aqueous solution of sodium chloride free from reduced matters.

FIG. 7 shows the correlation of voltage with reaction temperature, indicating that voltage decreases, i.e. electric resistance of water decreases as the reaction temperature rises. This demonstrates that lower electric power is required for electrolysis at high temperatures than low temperatures.

Example 7

Experimental conditions and results of Examples 7 to 9 are shown in Table 6.

TABLE 6

|  |  | Ex. 7 | Ex. 8 | Ex. 9 |
|---|---|---|---|---|
| Reaction conditions | Analyte | Trichloro-ethylene | DMSO | Malathion |
|  | Feed water volume (mL) | 150 | 150 | 150 |
|  | Feed water analyte content (wt %) | 876 | 521 | 2,203 |
|  | Feed water NaCl content (wt %) | 2 | 2 | 2 |
|  | NaOH loading (mg) | 120 | 60 | 280 |
|  | Initial Ar Pressure (MPa) | 3 | 3 | 3 |
|  | Reaction temperature (° C.) | 250 | 250 | 250 |
|  | Average reaction pressure (MPa) | 6.3 | 6 | 5.9 |
|  | Reaction time (min) | 5 | 15 | 25 |
|  | Anode type | Pt—Ir | Pt—Ir | Pt—Ir |
|  | Electrolytic current (A) | 2 | 2 | 6 |
|  | Average electrolytic voltage (V) | 2.9 | 2.9 | 3.3 |
| Gaseous product (gas composition in the reactor) | $H_2$ (vol %) | 1.6 | 4.6 | 16.6 |
|  | $O_2$ (vol %) | nd | Nd | nd |
|  | $CO_2$ (vol %) | 1.1 | 1.1 | 4.3 |
|  | CO (vol %) | nd | Nd | nd |
|  | $Cl_2$ (ppm) | nd | Nd | nd |
| Effluent water quality | Feed water TOC (mg/L) | 160 | 160 | 800 |
|  | Effluent TOC (mg/L) | 0.5 | 0.8 | 2 |
|  | TOC decomposition rate (%) | 99.7 | 99.5 | 99.8 |
|  | Effluent free chlorine (mg/L) | nd | Nd | nd |

Trichloroethylene was hydrothermally electrolyzed.

In a 150 mL graduated flask containing 0.131 g of trichloroethylene, 0.12 g of NaOH and 3 g of NaCl was added pure water to prepare 150 mL of feed water. Then, the whole amount of the feed water was added in the autoclave having an inner volume of 300 mL shown in FIG. 1 at room temperature under atmospheric pressure. A cylindrical platinum-iridium calcined electrode (outer diameter 25 mm, height 30 mm, thickness 0.5 mm) was placed at the center in the autoclave, which was then closed. Then, 3 MPa of argon gas was introduced into the autoclave from an argon bomb at room temperature under atmospheric pressure. Then, the autoclave was heated with an electric heater until the temperature in the autoclave reached 250° C. Starting from that moment (reaction time 0), hydrothermal electrolysis was continued at this temperature for 5 minutes. Starting from reaction time zero, 2 A dc was applied between the platinum-iridium calcined electrode in the autoclave serving as anode and the autoclave body serving as a cathode for 5 minutes. After current supply at the autoclave temperature of 250° C. for 5 minutes, the heater and dc supply were terminated simultaneously. Then, the autoclave was air-cooled with a fan.

Table 6 shows that the TOC of treated water was 0.5 mg/L as compared with the TOC of the feed water of 160 mg/L. Namely, 99% or more of trichloroethylene was decomposed (TOC decomposition rate). The pH of treated water was near neutral.

Trichloroethylene probably may have been decomposed by hydrothermal electrolysis according to the following oxidation reaction:

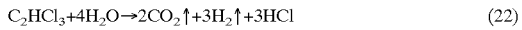
$$C_2HCl_3 + 4H_2O \rightarrow 2CO_2\uparrow + 3H_2\uparrow + 3HCl \qquad (22)$$

Example 8

Dimethyl sulfoxide (DMSO) was hydrothermally electrolyzed. DMSO is a sulfur-containing compound used as a water-soluble solvent.

To a 150 mL graduated flask was added 0.078 g of dimethyl sulfoxide (DMSO), 0.06 g of NaOH and 3 g of NaCl, and then pure water was added to prepare 150 mL of feed water. The whole amount of the feed water was added to the autoclave having an inner volume of 300 mL, as shown in FIG. 1, at room temperature under atmospheric pressure. A cylindrical platinum-iridium calcined electrode (outer diameter 25 mm, height 30 mm, thickness 0.5 mm) was placed at the center in the autoclave, which was then closed. Then, 3 MPa of argon gas was introduced into the autoclave from an argon bomb at room temperature under atmospheric pressure. Then, the autoclave was heated with an electric heater until the temperature in the autoclave reached 250° C. Starting from that moment (reaction time 0), hydrothermal electrolysis was continued at this temperature for 15 minutes. Starting from reaction time zero, 2 A dc was applied between the platinum-iridium calcined electrode in the autoclave serving as anode and the autoclave body serving as a cathode for 5 minutes. After keeping the autoclave at 250° C. and current supply for 15 minutes, the heater and dc supply were terminated simultaneously. Then, the autoclave was air-cooled with a fan.

Table 6 shows that the TOC of treated water was 0.8 mg/L as compared with the TOC of the feed water of 160 mg/L. Namely, 99% or more of DMSO was decomposed (TOC decomposition rate). The pH of treated water was near neutral.

Dimethyl sulfoxide probably may have been decomposed by hydrothermal electrolysis according to the following oxidation reaction:

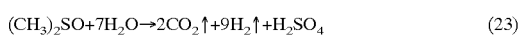
$$(CH_3)_2SO + 7H_2O \rightarrow 2CO_2\uparrow + 9H_2\uparrow + H_2SO_4 \qquad (23)$$

Example 9

Malathion was hydrothermally electrolyzed. Malathion is a compound containing phosphorus and sulfur for use as a pesticide.

To a 150 mL graduated flask was added 0.330 g of malathion, 0.28 g of NaOH, and 3 g of NaCl, and then pure water was added to prepare 150 mL of feed water. Then, the whole amount of the feed water was added in the autoclave having an inner volume of 300 mL shown in FIG. 1 at room temperature under atmospheric pressure. A cylindrical platinum-iridium calcined electrode (outer diameter 25 mm, height 30 mm, thickness 0.5 mm) was placed at the center in the autoclave, which was then closed. Then, 3 MPa of argon gas was introduced into the autoclave from an argon bomb at room temperature under atmospheric pressure. Then, the autoclave was heated with an electric heater until the temperature in the autoclave reached 250° C. Starting from that moment (reaction time 0), hydrothermal electrolysis was continued at this temperature for 25 minutes. Starting from reaction time zero, 6 A dc was applied between the platinum-iridium calcined electrode in the autoclave serving as anode and the autoclave body serving as a cathode for 25 minutes. After keeping the autoclave at 250° C. with current supply for 25 minutes, the heater and dc supply were terminated simultaneously. Then, the autoclave was air-cooled with a fan.

Table 6 shows that the TOC of the treated water was 2 mg/L as compared with the TOC of the feed water of 800 mg/L. Namely, 99% or more of malathion was decomposed (TOC decomposition rate) via hydrothermal electrolysis at a temperature of 250° C., 6 A dc for 25 minutes. The pH of treated water was near neutral.

Malathion probably may have been decomposed by hydrothermal electrolysis according to the following oxidation reaction:

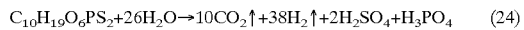

$$C_{10}H_{19}O_6PS_2+26H_2O \rightarrow 10CO_2\uparrow+38H_2\uparrow+2H_2SO_4+H_3PO_4 \quad (24)$$

Examples 10 to 12 and Comparative Example 5

In Examples 10 to 12 and Comparative Example 5, ammonia was subjected to hydrothermal reaction. In Examples 10, 11 and 12, 2 A, 4 A and 6 A dc were applied at 250° C. for a given period of reaction time, respectively. In Comparative Example 5, however, dc was not applied.

Commercially available 25% aqueous ammonia was diluted to prepare a feed ammonia water having an ammonia nitrogen content of 3000 mg/L. In the autoclave 10 having an inner volume of 300 mL, shown in FIG. 1, were added 150 mL of this feed ammonia water, then 4 g of NaCl at room temperature under atmospheric pressure. Then, a cylindrical ruthenium calcined electrode (outer diameter 25 mm, height 30 mm, thickness 0.5 mm) was placed at the center of the autoclave, which was then closed. Subsequently, 3 MPa of argon gas was introduced into the autoclave at room temperature under atmospheric pressure.

Then, the autoclave was heated with an electric heater until the temperature in the autoclave reached 250° C., at which it was maintained for a given period of time. Starting from the moment when 250° C. was reached, 2 A, 4 A and 6 A dc was applied to continue electrolysis for a given period of time in Examples 10, 11 and 12, respectively. In Comparative Example 5, however, dc was not applied.

The heater and dc supply were terminated simultaneously, and the autoclave was air-cooled with a fan.

Figure 8:
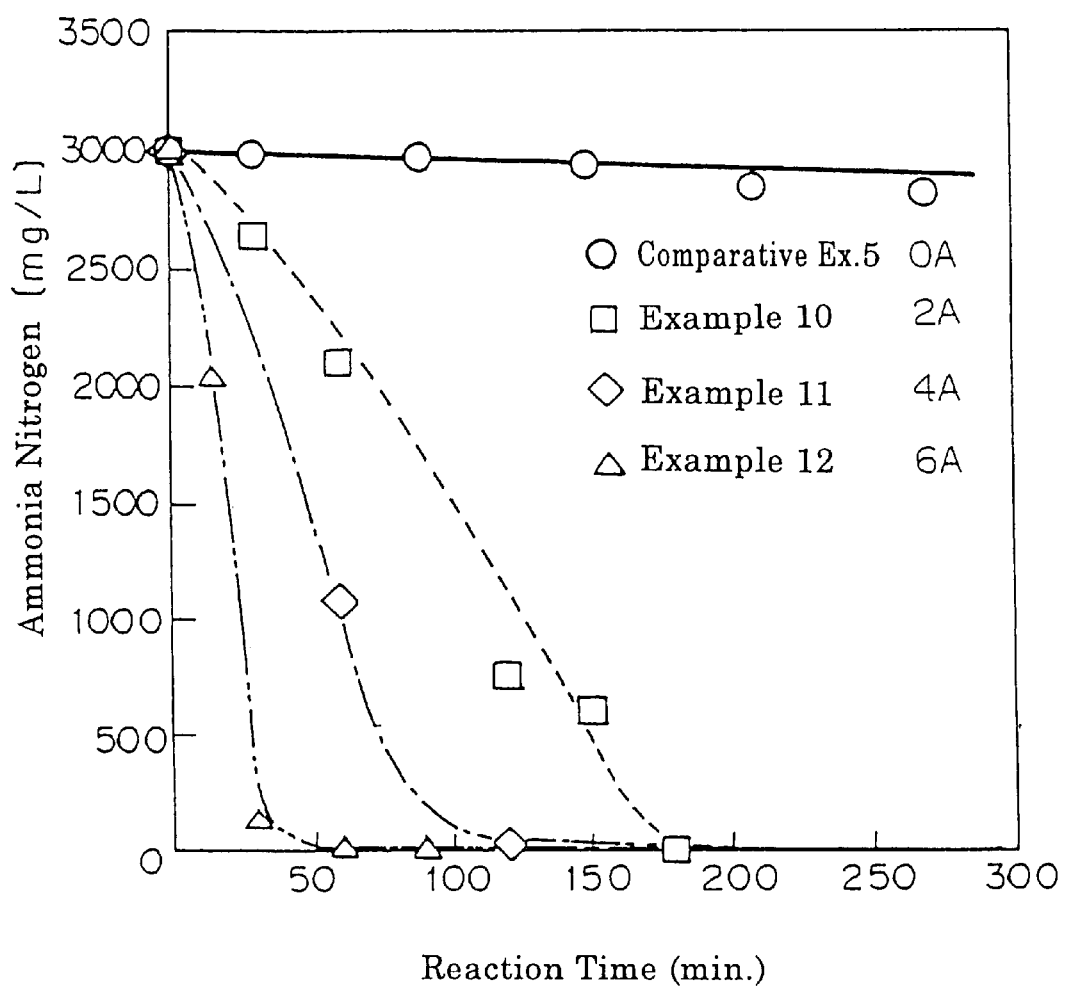
FIG. 8 is a graph showing the correlation of the ammonium nitrogen content with reaction time at different electrolytic current values concerning hydrothermal electrolysis of an aqueous ammonium solution.

FIG. 8 shows the correlation of ammonia nitrogen content with reaction time, indicating that ammonia is more rapidly decomposed at higher electrolytic current when the reaction time is constant.

Figure 9:
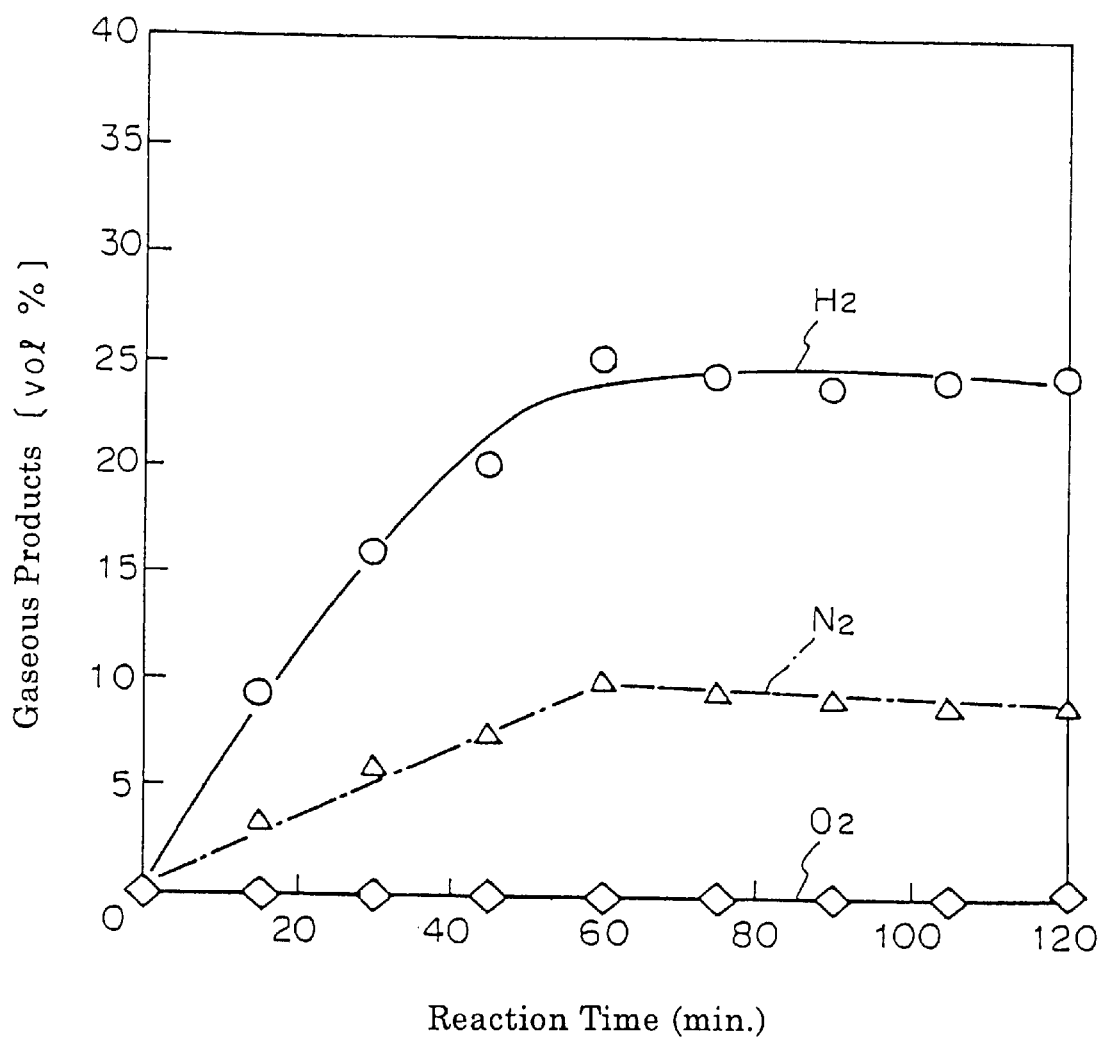
FIG. 9 is a graph showing the correlation of the composition of the gaseous product with reaction time concerning hydrothermal electrolysis of an aqueous ammonium solution.

FIG. 9 shows the correlation between a gaseous product composition and reaction time for 6 A dc charged in Example 12. The ratio between $H_2$ gas and $N_2$ gas is about 3:1. In Example 12, almost all of the ammonia nitrogen was decomposed after a reaction time of 60 minutes. FIG. 9 shows that, in Example 12, 60 minutes and 120 minutes reaction times generate about the same amount of hydrogen gases generated. This indicates that the absence of reduced matter (ammonia in this case) in the aqueous medium greatly supresses generation of hydrogen.

The overall reaction of hydrothermal electrolysis of ammonia may be as follows:

$$2NH_3 \rightarrow N_2\uparrow+3H_2\uparrow \quad (25)$$

A hydrogen gas generated in formula (25) results from electrolysis of water. Hydrogen contained in the ammonia molecule is not shown in the overall reaction formula (25) because it has been oxidatively decomposed into water.

Examples 13 and 14

In Examples 13 and 14, ammonia was subjected to hydrothermal reaction.

Figure 10:
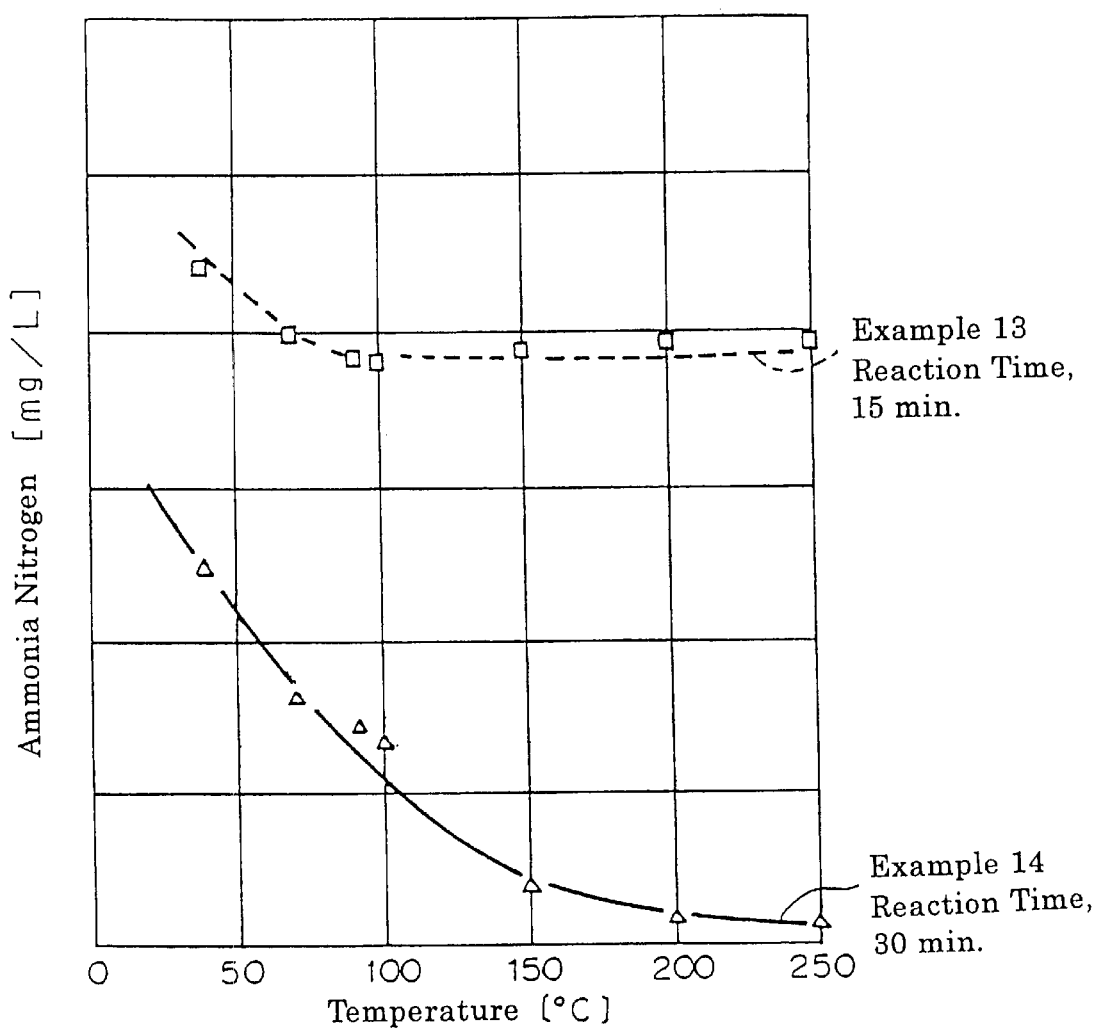
FIG. 10 is a graph showing the correlation of the ammonium nitrogen content with reaction temperature at different reaction times concerning hydrothermal electrolysis of an aqueous ammonium solution.

Hydrothermal reaction was performed under the same conditions as in Example 12 except for reaction temperature and reaction time. In Examples 13 and 14, reaction times were 15 minutes and 30 minutes, respectively, and reaction temperature was varied. Results are shown in FIG. 10.

When the reaction time is 30 minutes, ammonia is rapidly decomposed as the reaction temperature rises. Ammonia is decomposed even at low temperatures, because the aqueous medium becomes rich in hypochlorous acid during electrolysis at low temperatures (see FIG. 6). Although this reaction between hypochlorous acid and ammonia at low temperatures proceeds as a known break-point reaction, hydrothermal electrolysis of the present invention obviously allows ammonia to be rapidly decomposed almost in the absence of hypochlorous acid in the aqueous medium.

Examples 15 and 16 and Comparative Example 6

Figure 11:
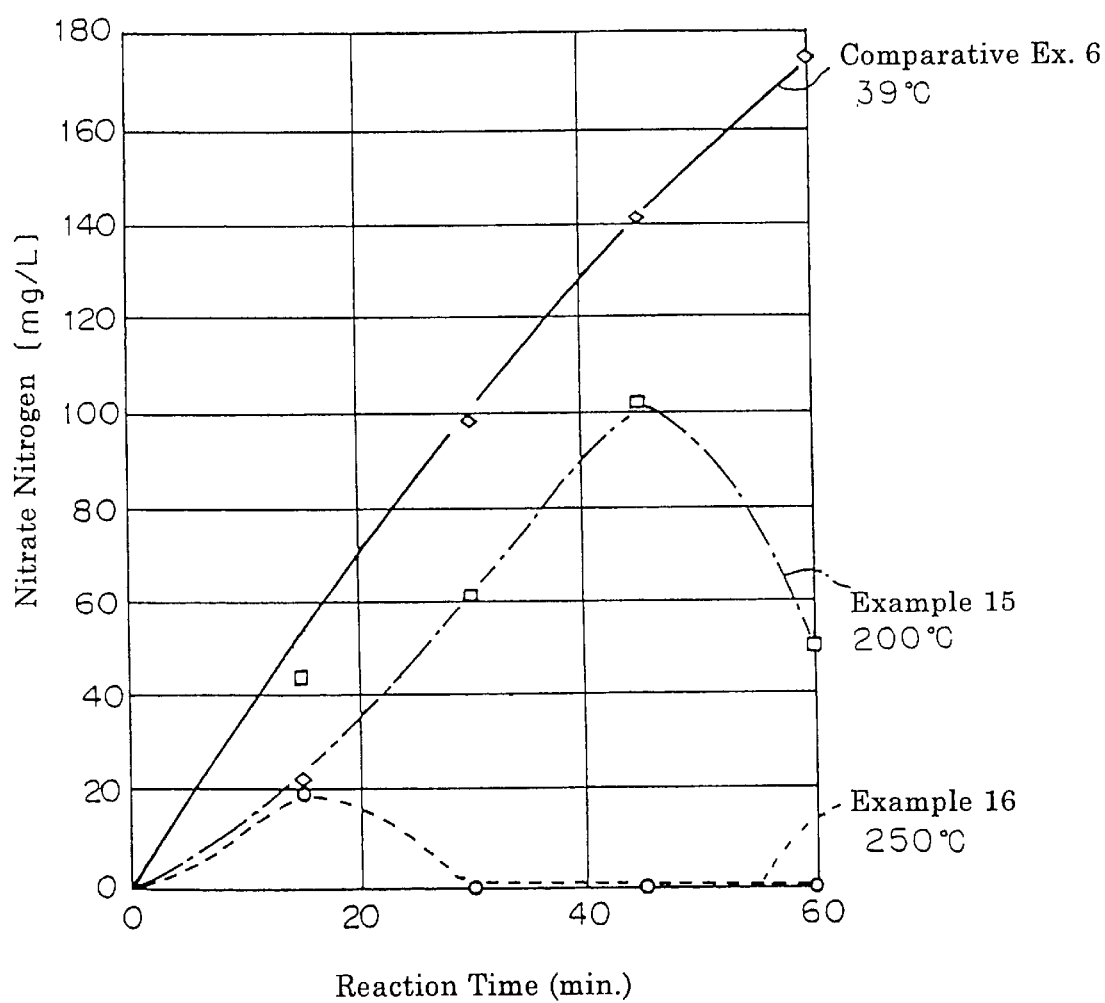
FIG. 11 is a graph showing the correlation of the nitrate nitrogen content with reaction time at different temperatures concerning hydrothermal electrolysis of an aqueous ammonium solution.

Hydrothermal reaction was performed under the same conditions as in Example 12 except for reaction temperature and reaction time. In Examples 15 and 16, reaction temperatures were 200° C. and 250° C., respectively. In Comparative Example 6, reaction temperature was 39° C. Nitrate nitrogen contents were measured for varying reaction times. Results are shown in FIG. 11.

It was confirmed that nitrate ion is generated as an intermediate product when ammonia is electrolytically decomposed. The content of nitrate nitrogen generated at a low temperature such as 39° C. continuously increased within the period of reaction time of this Comparative Example. However, in Example 16 wherein ammonia is subject to the hydrothermal electrolysis at 250° C., the nitrate nitrogen is once generated, but after a short period of time, the nitrate nitrogen is decomposed again. Nitrate ions presumably have been mineralized into a nitrogen gas via cathodic reaction in the present invention.

Examples 17, 18 and 19

Monoethanolamine, i.e. 2-aminoethanol was hydrothermally electrolyzed. In Examples 17, 18 and 19, feed waters having monoethanolamine concentrations of 20,000 mg/l, 10,000 mg/l and 5,000 mg/l were used, respectively.

To the autoclave 10 having an inner volume of 300 mL shown in FIG. 1 were added 110 mL of said feed water, then 4 g of NaCl at room temperature under atmospheric pressure. Then, a cylindrical ruthenium calcined electrode (outer diameter 25 mm, height 30 mm, thickness 0.5 mm) was placed at the center of the autoclave, which was then closed. Subsequently, 3 MPa of argon gas was introduced into the autoclave at room temperature under atmospheric pressure.

Then, the autoclave was heated with an electric heater until the temperature in the autoclave reached 250° C., at which it was maintained for a given period of time. Starting from the moment when the temperature reached 250° C., 12 A dc was supplied to continue electrolysis for a given period of time. Then, the heater and dc supply were terminated simultaneously, and the autoclave was air-cooled with a fan.

Figure 12:
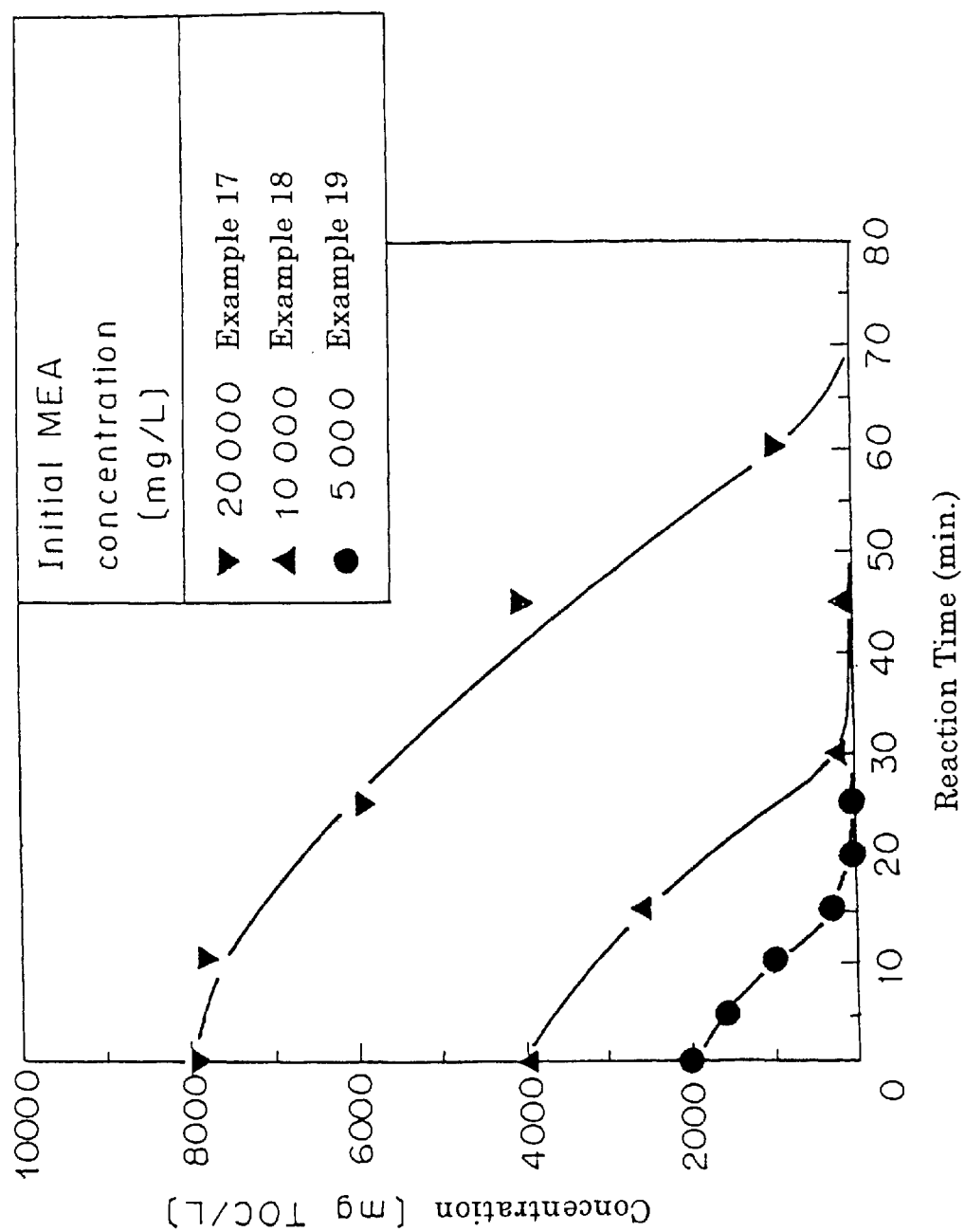
FIG. 12 shows the correlation of the total organic carbon (TOC) in a resultant, treated water with reaction time concerning hydrothermal electrolysis of an aqueous monoethanolamine (MEA) solution at different concentrations.

FIG. 12 shows the correlation of total organic carbon (TOC) with reaction time, indicating that monoethanolamine is decomposed in substantially direct proportion with reaction time. In all the examples shown in FIG. 12, which apply electrolytic current of 12 A, a higher decomposition rate can be obtained within a short period of time at lower monoethanolamine concentrations in feed water.

The overall reaction of hydrothermal electrolysis of monoethanolamine presumably proceeds according to the following reaction formula:

$$2HOC_2H_4NH_2 + 6H_2O \rightarrow N_2\uparrow + 4CO_2\uparrow + 13H_2\uparrow \qquad (26)$$

Figure 13:
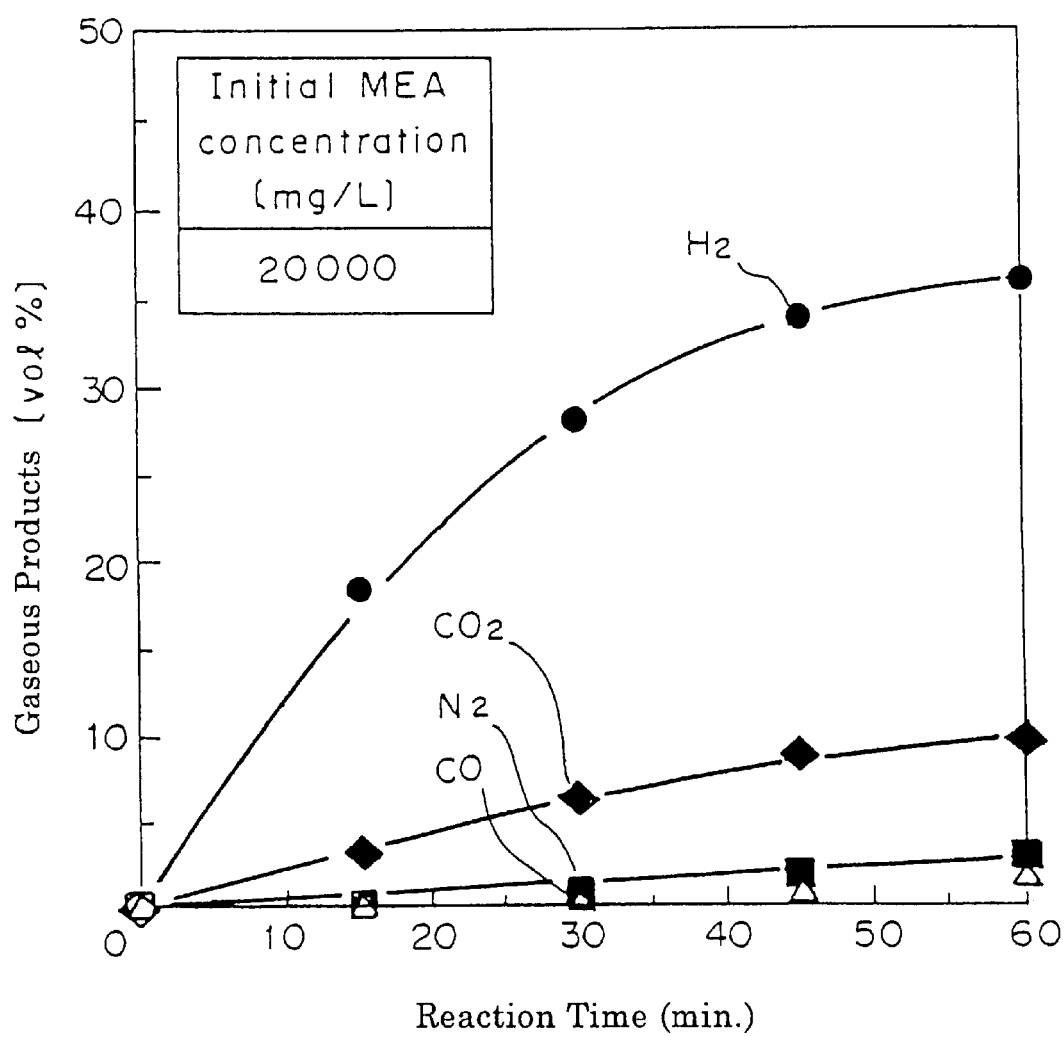
FIG. 13 shows the correlation of the composition of the gaseous product with reaction time concerning hydrothermal electrolysis of an aqueous monoethanolamine solution.

FIG. 13 shows the composition of the gaseous product in Example 17. As shown in FIG. 13, the nitrogen gas, carbon dioxide gas and hydrogen gas contents at a reaction time of 60 minutes are 2.46 vol %, 9.38 vol % and 3.58 vol %, respectively, which are almost consistent with the product ratio of reaction formula (25).

In Examples 20 and 21 and Comparative Examples 7 and 8, hydrothermal reaction was performed on an organic sludge in the autoclave as shown in FIG. 1. Characteristics and results of the organic sludge are shown in Table 7.

Example 20

Sodium chloride was added to sludge at a chloride ion content of 0.5 mmol/L in the sludge.

Using a platinum-plated electrode, a constant current of 6 A was supplied for 2 hours at 250° C. under a pressure of 70 atm. Average voltage was 10 V. The pressure was maintained at 70 atm via the pressure-control valve 43. After current supply for 2 hours, the heater and current supply were terminated and the autoclave was cooled.

Experimental conditions and results are shown in Table 7.

After reaction, gas was odorless, and treated water had a relatively clear pale yellow color and precipitates. Solids precipitated well. The inside of the autoclave was not corroded at all.

TABLE 7

|   |   | Feed influent | Ex. 20 | Ex. 21 | Com. ex. 7 | Com. ex. 8 |
|---|---|---|---|---|---|---|
| Treatment Conditions | Temperature, °C. | — | 250 | 250 | 250 | 250 |
|   | Pressure, atm | — | 70 | 70 | 70 | 70 |
|   | Electrolytic current, A | — | 6 | 6 | 0 | 0 |
|   | Reaction time, h | — | 2 | 2 | 2 | 2 |
|   | Oxygen, atm | — | 0 | 0 | 0 | 0 |
| MLSS, mg/l |   | 12,000 | 3,420 | 2,988 | 4,275 | 3,750 |
| MLVSS, mg/l |   | 9,800 | 1,662 | 1,309 | 2,438 | 1,720 |
| Supernatant TOC, mg/l |   | 10 | 1,349 | 986 | 2,970 | 1,800 |
| Supernatant COD, mg/l |   | 5.4 | 888 | 396 | 3,100 | 2,332 |
| PH |   | 7.3 | 5.71 | 4.71 | 6.36 | 5.2 |
| Supernatant color |   | Clear | Pale Yellow | Clear | Black | Brown |
| Effluent gas odor |   | No | No | No | Bad | No |
| Corrosion in the autoclave |   | — | No | No | Yes | Severe |

Example 21

Hydrothermal electrolysis was performed under the same conditions as in Example 20 except that the platinum-plated electrode was replaced with a ruthenium oxide calcined electrode and that sodium chloride was added at a chloride ion content of 10.0 mmol/L in the sludge.

After reaction, gas was odorless and treated water was wholly clear. Solids precipitated well. The inside of the autoclave was not corroded at all.

Comparative Example 7

Hyrothermal reaction was performed under the same conditions as in Example 20 except that the platinum electrode was not placed in the autoclave 10. After reaction, gas had a very bad odor, and treated water was black. Solids did not always precipitate. The inner wall of the autoclave was somewhat corroded.

Comparative Example 8

In the autoclave not equipped with an electrode was added 150 ml of organic sludge, then 60 atm of argon gas and 10 atm of an oxygen gas were introduced at room temperature. One hour after heating of the autoclave was started, a temperature of 250° C. was reached. The autoclave was maintained at 250° C. under 70 atm for 2 hours, then cooled.

After reaction, gas was odorless and treated water was brown. Solids in the effluent precipitated well. The inner wall of the autoclave was heavily corroded.

Example 22

Formation of scale in hydrothermal reaction was controlled by hydrothermal electrolysis.

The polarities of electrodes were temporally inverted during hydrothermal electrolysis to control formation of scale on the inner wall of the autoclave.

The autoclave shown in FIG. 1 was used. The anode was a titanium base plated with platinum.

Feed water used was tap water containing calcium chloride and sodium bicarbonate at a calcium hardness of 250 mg/L and a total alkalinity of 200 mg/L.

In the autoclave was added 150 ml of the feed water. While heating the autoclave, 150 mA dc was supplied. This corresponds to an anodic current density of 2 mA/cm². The autoclave was heated such that temperature increases at a constant rate, and after the temperature reached 200° C., the autoclave was maintained at 200° C. for 40 minutes. During this process, the polarities of the electrodes were appropriately inverted as shown in Table 8.

TABLE 8

| Time, min. | Temperature, ° C. | Voltage, V | Electrolytic polarity |
|---|---|---|---|
| 0 | 20 | 4.2 | Positive |
| 10 | 50 | 4.3 | Positive |
| 20 | 80 | 4.6 | Positive |
| 30 | 110 | 5.3 | Positive |
| 40 | 140 | 5.9 | Positive |
| 50 | 170 | 6.3 | Positive |
| 60 | 200 | 6.5 | Positive → inverse |
| 70 | 200 | 4.3 | Inverse |
| 80 | 200 | 4.6 | Inverse → positive |
| 90 | 200 | 4.1 | Positive |
| 100 | 200 | 4.3 | Positive |

After the lapse of 100 minutes, current supply was terminated, and the autoclave was cooled. No scale deposited on the inner wall of the reactor.

Comparative Example 9

Hydrothermal electrolysis was performed under the same conditions as in Example 22 except that the polarities of electrodes were not inverted. Scale deposited on the inner wall of the reactor.

Examples 23 and 24

Example 23 demonstrates hydrothermal electrolysis of acetic acid when an oxygen gas was added as an oxidizing agent. Example 24 differs from Example 23 in that an oxygen gas was not added.

In the autoclave having an inner volume of 300 mL shown in FIG. 1 was added 150 mL of feed water containing acetic acid in pure water at an acetic acid content of 4,000 mg/L at room temperature under atmospheric pressure. Then, 3 g of NaCl was added in the autoclave. Then, a cylindrical platinum plate electrode (outer diameter 25 mm, height 30 mm, thickness 0.5 mm) was placed at the center in the autoclave, which was then closed. Subsequently, 1 MPa of an oxygen gas and 2 MPa of argon gas (a total of 3 MPa) were introduced. Then, the autoclave was heated with an electric heater. Starting from the moment when the temperature in the autoclave reached 250° C. (reaction time zero), electrolysis was continued for 60 minutes at this temperature. Starting from reaction time zero, 2 A dc was applied between the platinum-plated electrode in the autoclave serving as anode and the autoclave body serving as a cathode. Also starting from reaction time zero, the valves 45 and 43 shown in FIG. 1 were operated at intervals of 15 minutes to collect a small amount of gaseous components and the reaction solution in the autoclave.

In Example 24, 3 MPa of argon gas was introduced into the autoclave instead of 1 MPa of an oxygen gas and 2 MPa of argon gas in Example 23. Namely, an oxygen gas was not added as an oxidizing agent. Other conditions and operations were similar to those of Example 23. In Example 24, only argon gas was introduced into the autoclave without adding an oxygen gas to perform hydrothermal electrolysis of an aqueous acetic acid solution.

Figure 14:
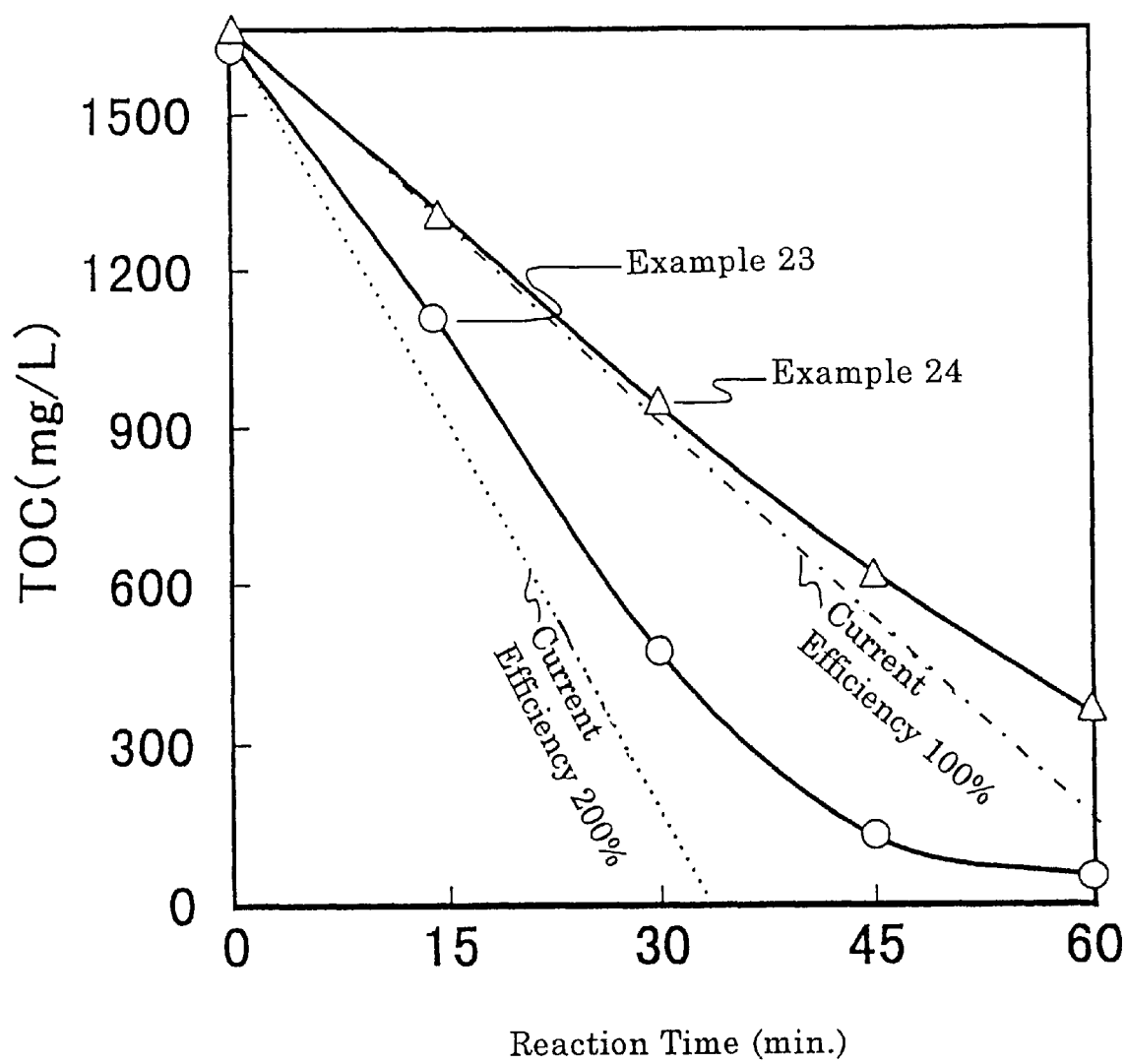
FIG. 14 shows the correlation of the total organic carbon (TOC) in a resultant, treated water with reaction time concerning hydrothermal electrolysis of an aqueous acetic acid solution.

FIG. 14 shows TOCs in the reaction solutions collected at each reaction time, indicating that acetic acid is more rapidly decomposed in the presence of an oxygen gas (Example 23) than otherwise (Example 24).

FIG. 14 also shows calculated TOCs based on the Faraday's law when 2 A current is applied across electrodes at current efficiencies of 100% and 200%. Both calculated values are based on only anodic reaction. Namely, the calculated TOC at a current efficiency of 100% is based on the premise that the current applied across electrodes is totally consumed to generate an oxidizing agent (reaction formula (17)) and that said oxidizing agent is totally consumed for oxidation reaction with acetic acid (reaction formula (16)) at the anode. The calculated TOC at a current efficiency of 200% is based on the premise that an oxidizing agent is generated double the amount generated at the anode.

In Example 23, the current efficiency apparently exceeds about 100%, suggesting that not only the anode but also the cathode participate in decomposition reaction. Such participation of the cathode in decomposition may be described by the following reactions.

The oxygen gas added is dissolved in aqueous phase under high pressure (reaction formula (27)), and then the dissolved oxygen is converted into active oxygen via reduction reaction at the cathode as shown in reaction formula (28).

$$O_2 \rightarrow O_2(aq) \quad (27)$$

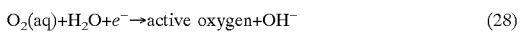

$$O_2(aq) + H_2O + e^- \rightarrow \text{active oxygen} + OH^- \quad (28)$$

Here, active oxygen has a high oxidizing ability to rapidly oxidize organic matters.

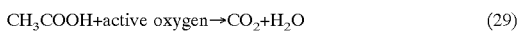

$$CH_3COOH + \text{active oxygen} \rightarrow CO_2 + H_2O \quad (29)$$

Namely, the current efficiency based on only anodic reaction exceeds 100%, probably because cathodic decomposition reaction (reaction formulae (27) to (29)) proceeds in addition to anodic decomposition reaction (reaction formulae (16) and (17)) in hydrothermal electrolysis when oxygen is added. Therefore, addition of an oxidizing agent can save electric power needed for hydrothermal electrolysis.

Figure 15:
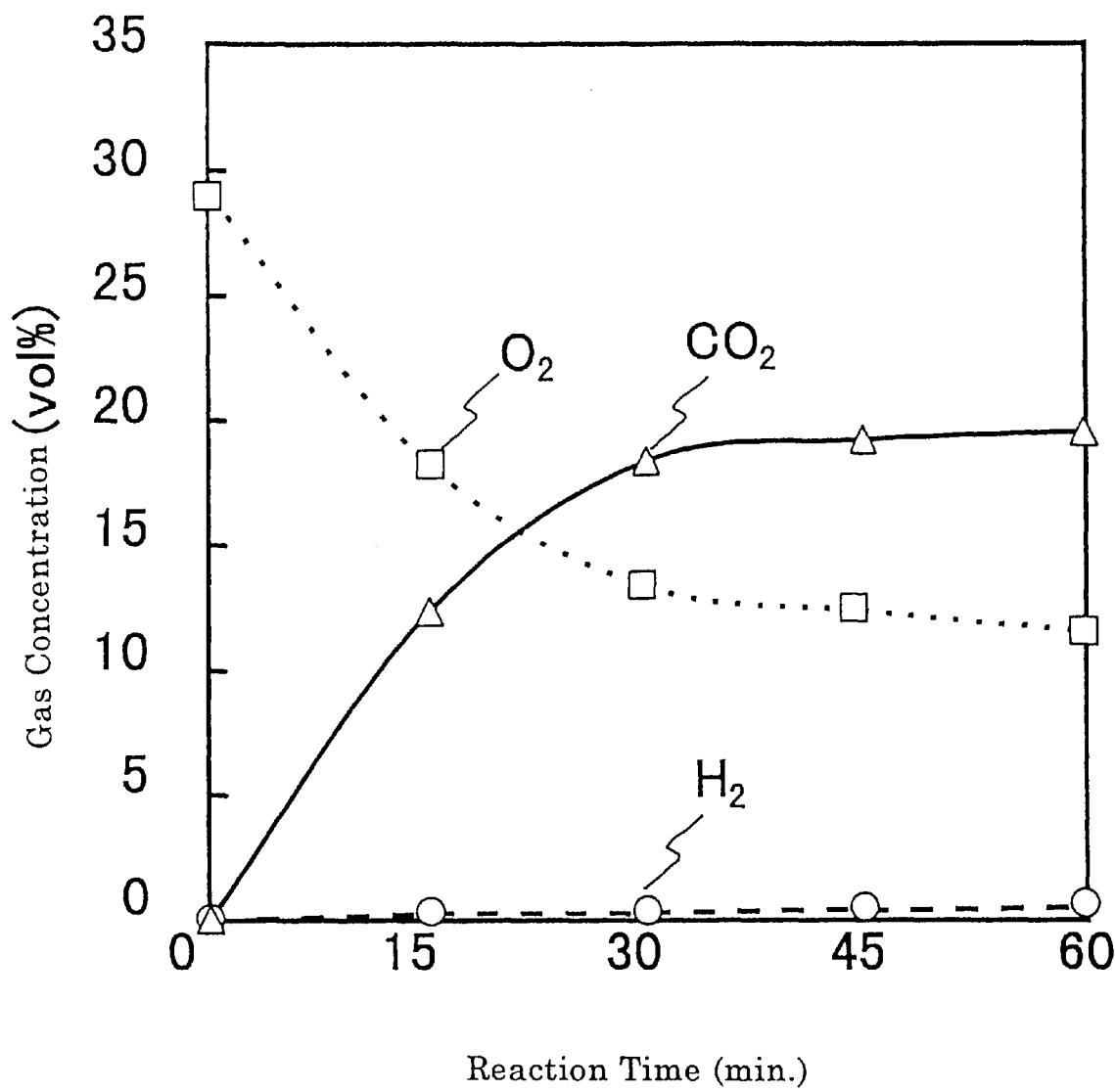
FIG. 15 shows the correlation of gas contents with reaction time concerning hydrothermal electrolysis of an aqueous acetic acid solution.

FIG. 15 shows the contents of gaseous components collected from the autoclave in Example 23. The oxygen gas is rapidly consumed to produce a gas essentially consisting of carbon dioxide gas. Moreover, the active oxygen-producing reaction (28) proceeds at the cathode to greatly repress the hydrogen-producing reaction (18). This means that even addition of an oxygen gas in a high-pressure reactor can not give a mixed gas of oxygen and hydrogen involving the danger of explosion. Thus, either gaseous (the oxygen gas in Example 23) or liquid (the hydrogen peroxide in Examples 5 and 6) oxidizing agents externally added repress hydrogen generation.

Figure 16:
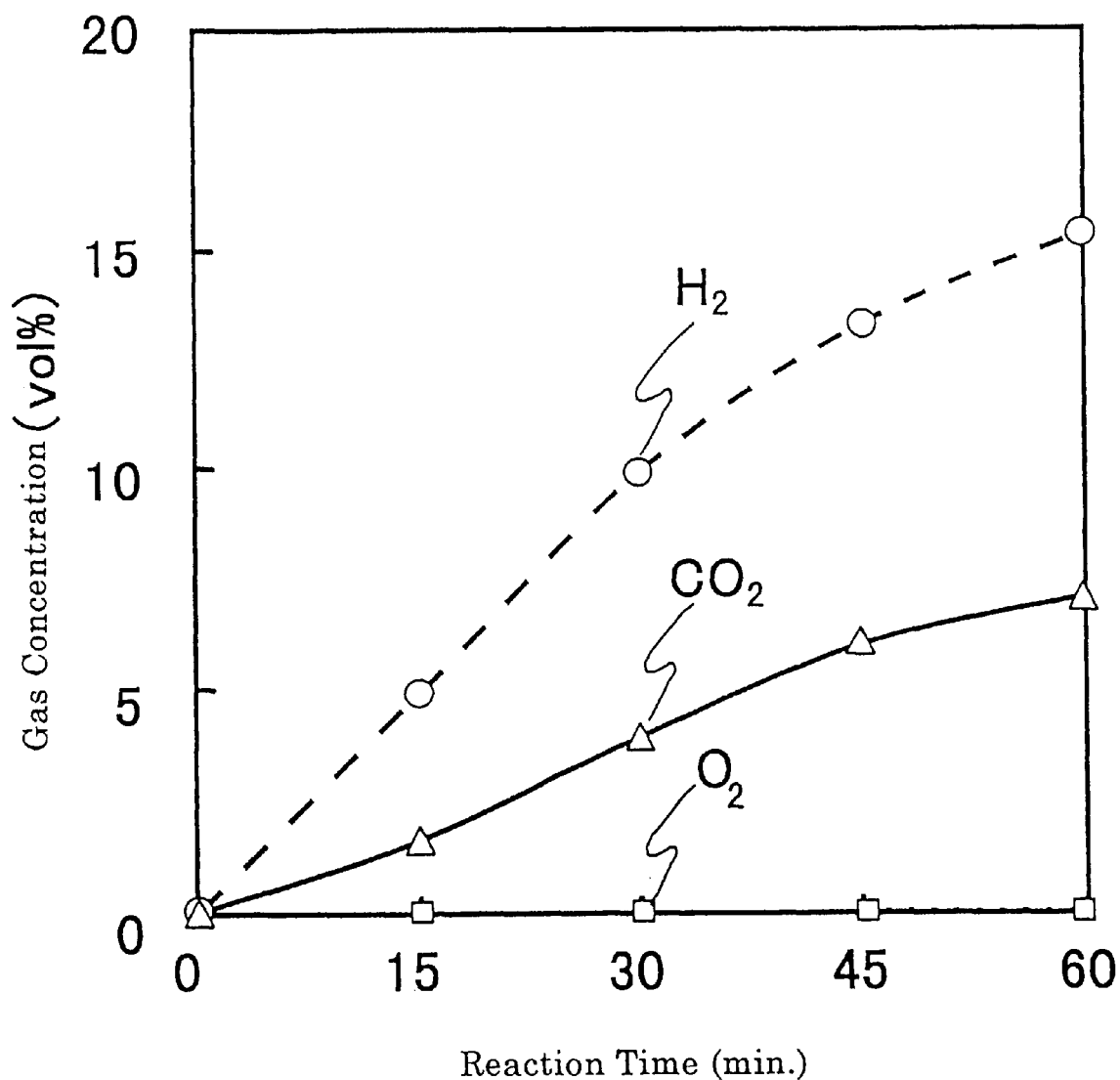
FIG. 16 shows the correlation of gas contents with reaction time in hydrothermal electrolysis of an aqueous acetic acid solution.

FIG. 16 shows the contents of gaseous components collected from the autoclave in Example 24 with no oxygen added. The gaseous product consist of hydrogen and carbon dioxide gas. No detectable oxygen gas ($O_2$) was generated. Therefore, there is little danger of explosion even in the presence of a hydrogen gas because no oxygen gas exists. This demonstrates that acetic acid contained in the reaction solution has been decomposed into carbon dioxide gas ($CO_2$). An oxidizing agent is supplied from water molecule ($H_2O$) via electrolysis Oxygen atom (O) of water molecule is used to convert acetic acid into carbon dioxide gas ($CO_2$), and hydrogen atom (H) of water molecule is used to generate a hydrogen gas ($H_2$).

In hydrothermal electrolysis of an aqueous medium containing a reduced matter, if oxygen is added hydrogen is not produced, while if oxygen is not added, hydrogen is produced without the production of oxygen. Thus, hydrothermal electrolysis of an aqueous medium containing a reduced matter can prevent formation of a highly explosive mixed gas of oxygen and hydrogen to ensure safety whether an oxidizing agent is added or not.

Examples 25 to 28 and Comparative Example 10

In Examples 25 to 28 and Comparative Example 10, electrolytic current was varied in hydrothermal electrolysis of acetic acid with an oxygen gas added.

Figure 17:
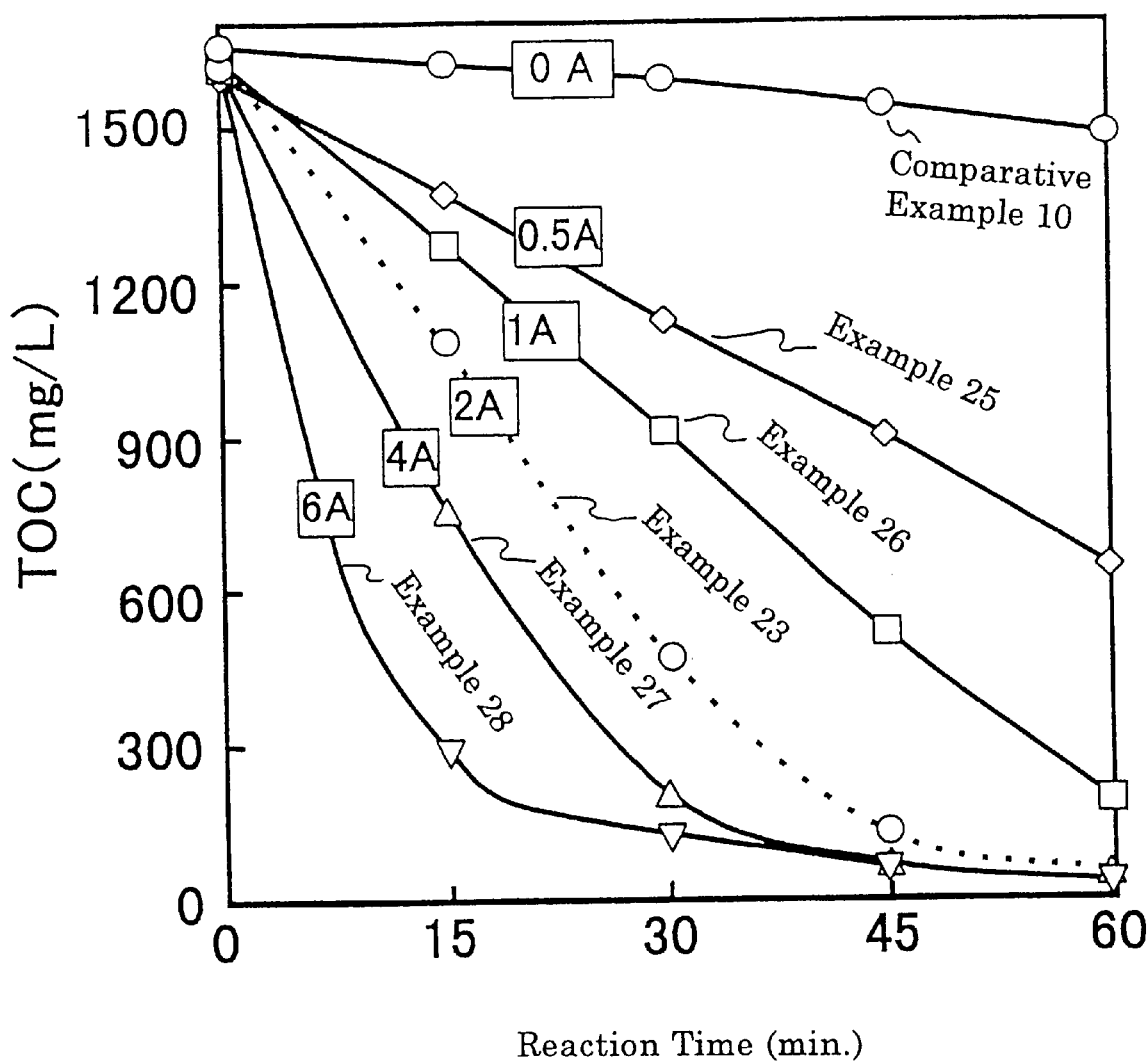
FIG. 17 shows the correlation of the total organic carbon (TOC) in a resultant, treated water with reaction time in hydrothermal electrolysis of an aqueous acetic acid solution.

In Examples 25 to 28, current of 0.5 A, 1 A, 4 A and 6 A was applied. In Comparative Example 10, however, no current was applied. Other conditions were the same as in Example 23. Results are shown in FIG. 17.

In Comparative Example 10 with no current applied, acetic acid was decomposed very slowly. However, Examples 25 to 28 with current applied rapidly gave high decomposition rates as electrolytic current increased. Namely, hydrothermal electrolysis involving anodic reaction and cathodic reaction with addition of oxygen can effectively decompose acetic acid, which is difficult to decompose by the conventional wet oxidation relying on the action of dissolved oxygen alone.

Examples 29 and 30

In Examples 29 and 30, an oxygen gas content was varied in hydrothermal electrolysis of acetic acid when an oxygen gas was added.

Figure 18:
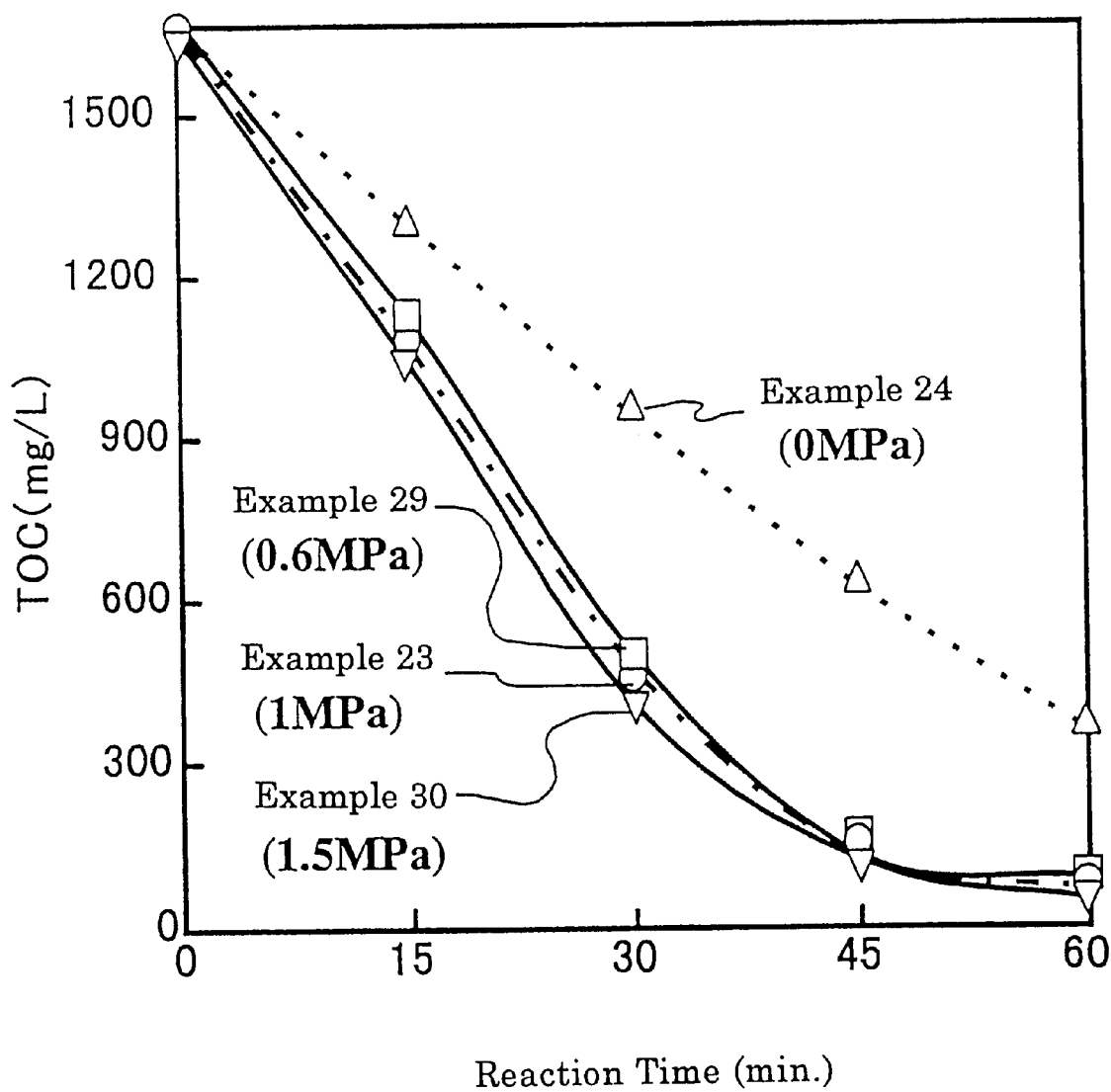
FIG. 18 shows the correlation of the total organic carbon (TOC) in a resultant, treated water with reaction time in hydrothermal electrolysis of an aqueous acetic acid solution.

In Examples 29, 0.6 MPa of an oxygen gas and 2.4 MPa of argon gas were introduced. In Example 30, 1.5 MPa of an oxygen gas and 1.5 MPa of argon gas were introduced. Other conditions were the same as in Example 23. Results are shown in FIG. 18.

According to the present invention which performs hydrothermal reaction and electrolysis simultaneously, reduced matters such as organic matters or ammonia can effectively be decomposed by oxidation.

According to the conventional catalytic oxidation process, halide ions corroded the reactor. According to the present invention, however, halide ions can promote oxidative decomposition of reduced matters. Moreover, the inner wall of the reactor can be protected from corrosion via cathodic protection if the inner wall of the reactor is used as a cathode.

Comparative Examples 11 and 12 and Example 31

In Comparative Examples 11 and 12 and Example 31, acetic acid was hydrothermally electrolyzed in the presence of an oxygen gas with no halogen ion existing in the aqueous medium.

In Comparative Example 11, acetic acid was hydrothermally electrolyzed without adding any electrolyte. Other reaction conditions were the same as in Example 23 except that NaCl was not added. Namely, acetic acid was dissolved in pure water and 2 A dc was applied across electrodes at 250° C. in the presence of an oxygen gas in the autoclave. In this Comparative Example, the voltage needed to apply 2 A was 48 V on average.

In the absence of a salt serving as electrolyte, the electric resistance of the aqueous acetic acid solution rises to incur high voltage during dc supply, therefore a cost for electric power increases.

Figure 19:
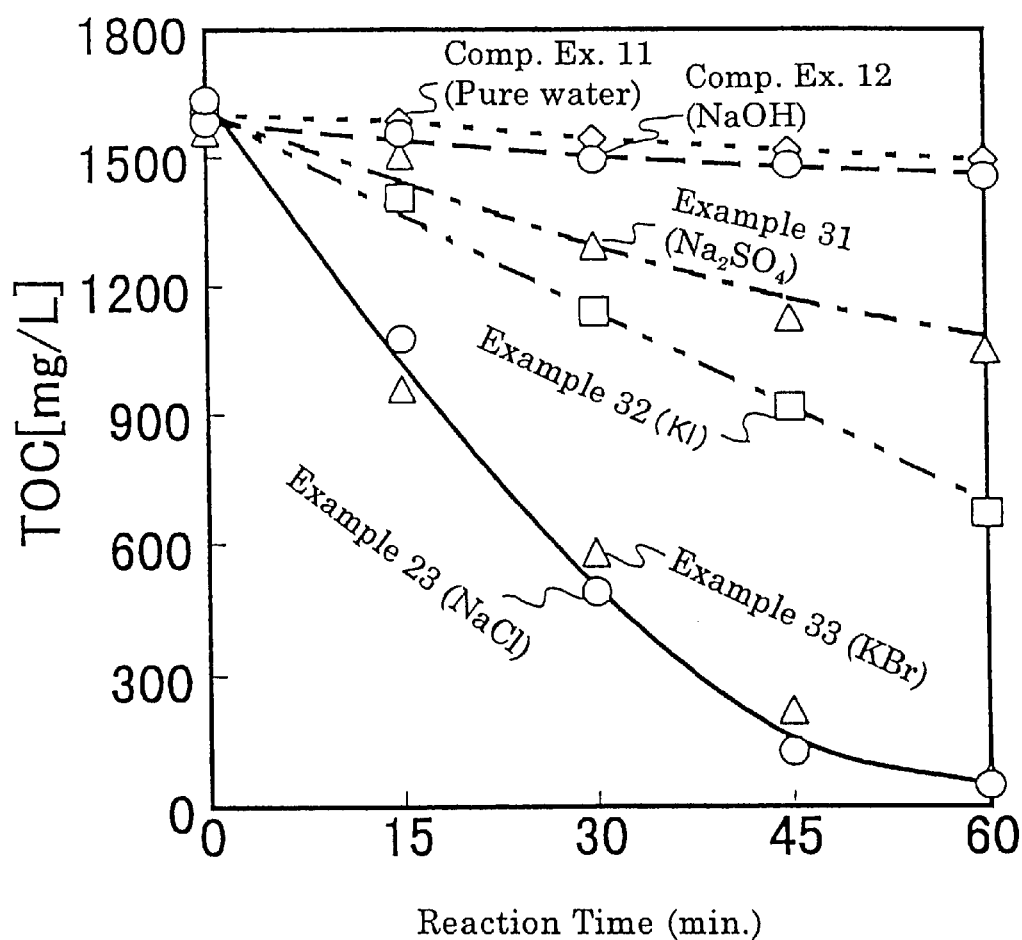
FIG. 19 shows the correlation of the total organic carbon (TOC) in a resultant, treated water with reaction time in hydrothermal electrolysis of an aqueous acetic acid solution.

FIG. 19 shows variation in TOC in this Comparative Example. A little amount of acetic acid was decomposed.

In Comparative Example 12, 3 g of NaOH was used as electrolyte. Other reaction conditions were the same as in Example 23 except that NaCl was replaced with NaOH. The voltage needed to apply 2 A dc between the electrodes was 3 V because the electrolyte NaOH was contained in the aqueous medium.

As shown in FIG. 19, a little amount of acetic acid was decomposed similarly to Comparative Example 11 as demonstrated by variation in TOC.

In Example 31, 3 g of $Na_2SO_4$ was used as electrolyte. Other reaction conditions were the same as in Example 23 except that NaCl was replaced with $Na_2SO_4$. The voltage needed to apply 2 A dc across electrodes in this example was 3 V.

FIG. 19 shows variation in TOC. TOC decreased with reaction time. This indicates that sulfate ion ($SO_4^{2-}$) promotes decomposition of acetic acid similarly to halogen ions.

Examples 32 and 33

In Examples 32 and 33, acetic acid was hydrothermally electrolyzed in the presence of an oxygen gas as the oxidizing agent, using iodine ion and bromine ion, respectively, as a halogen ion. It was confirmed that the iodine ion and bromine ion decompose organic matters as well as the chlorine ion in hydrothermal electrolysis.

In Example 32, 3 g of KI (potassium iodide) was used as electrolyte. Other reaction conditions were the same as in Example 23 except that NaCl was replaced with KI. The voltage needed to apply 2 A dc between the electrodes in this example was 3 V.

FIG. 19 shows variation in TOC. TOC decreased with reaction time. In Example 32, a tendency was observed that the treated water changes to a somewhat red color.

Example 33, 3 g of KBr (potassium bromide) was used as electrolyte. Other reaction conditions were the same as in Example 23 except that NaCl was replaced with KBr. The voltage needed to apply 2 A dc between the electrodes in this example was 3 V.

FIG. 19 shows variation in TOC. TOC decreased with reaction time. Bromine ion decomposed acetic acid into carbon dioxide gas. This result was quantitatively comparable to that of chlorine ion.

Comparative Example 13

In Comparative Example 13 and Example 34, sodium hypochlorite was used as an oxidizing agent. In Comparative Example 13, simple hydrothermal oxidation reaction was performed without applying current across electrodes, i.e. wet oxidation. In Example 34, however, current was applied across electrodes to perform hydrothermal electrolysis.

In Comparative Example 13, 150 mL of feed water containing acetic acid and a sodium hypochlorite solution in pure water at an acetic acid content of 4,000 mg/L and an NaOCl (sodium hypochlorite) content of 0.6 wt % was added into the autoclave having an inner volume of 300 mL shown in FIG. 1 at room temperature under atmospheric pressure. Then, 3 MPa of argon gas was introduced into the autoclave. Then, the autoclave was heated with an electric heater. Starting from the moment when the temperature in the autoclave reached 250° C. (reaction time zero), wet oxidation reaction was continued at this temperature for 60 minutes. Starting from reaction time zero, the valves 45 and 43 shown in FIG. 1 were operated at intervals of 15 minutes to collect a small amount of gaseous components and the reaction solution in the autoclaves.

Figure 20:
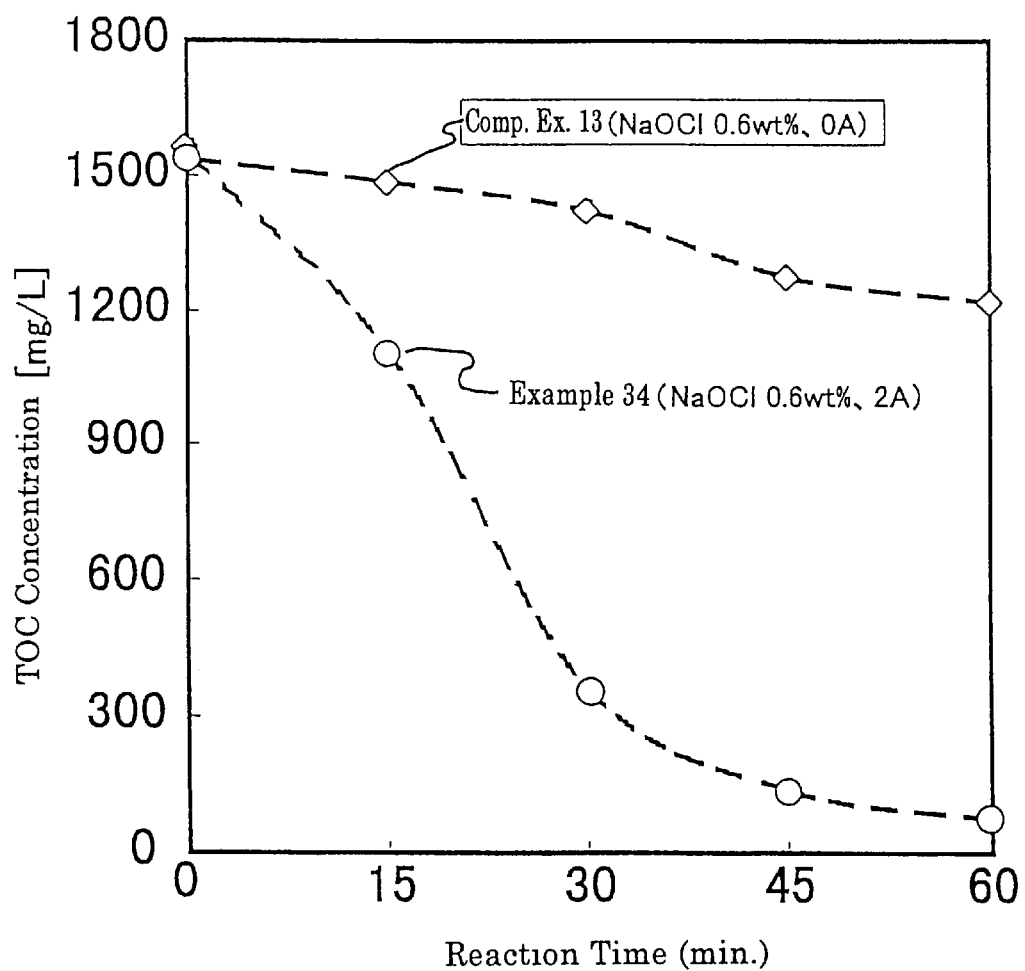
FIG. 20 shows the correlation of the total organic carbon (TOC) in a resultant, treated water with reaction time in hydrothermal electrolysis of an aqueous acetic acid solution.

FIG. 20 shows variation in TOC of the collected reaction solution, indicating that wet oxidation of Comparative Example 13 using sodium hypochlorite as an oxidizing agent decomposed acetic acid at low efficiency. Hypochlorite is thought to involve in an oxidation reaction route in hydrothermal electrolysis, but the same effect can not be obtained even if a chemical oxidizing agent sodium hypochlorite is used in wet oxidation. In hydrothermal electrolysis, organic matters are effectively oxidatively decomposed probably because a hypohalous acid is generated in situ in the field of the hydrothermal reaction, which is highly reactive. If sodium hypochlorite is added in the autoclave in wet oxidation, however, the following autodecomposition reaction may proceed during heating of the autoclave.

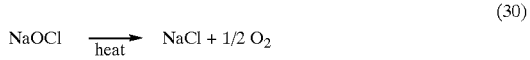
(30)

In wet oxidation using a hypochlorite as an oxidizing agent, the hypochlorite seems to autodecompose from a temperature of 100° C. or less and be almost lost at the reaction temperature leaving an oxygen gas.

In hydrothermal electrolysis, hypochlorite ion seems to involve in the reaction. However, the above difference in reactivity clearly distinguishes hydrothermal electrolysis from wet oxidation reaction using a chemical hypochlorite. Although Comparative Example 13 is a batch test, the hypochlorite seems to also autodecompose in a continuous system.

Example 34

In Example 34, acetic acid was hydrothermally hydrolyzed using a chemical oxidizing agent sodium hypochlorite when 2 A dc was applied across electrodes.

In the autoclave having an inner volume of 300 mL shown in FIG. 1 was added 150 mL of feed water containing acetic acid and a sodium hypochlorite solution in pure water at an acetic acid content of 4,000 mg/L and an NaOCl (sodium hypochlorite) content of 0.6 wt % at room temperature under atmospheric pressure. Then, a cylindrical platinum plate electrode (outer diameter 25 mm, height 30 mm, thickness 5 mm) was placed at the center in the autoclave, which was then closed. Then, 3 MPa of argon gas was introduced into the autoclave. Then, the autoclave was heated with an electric heater. Starting from the moment when the temperature in the autoclave reached 250° C. (reaction time zero), wet oxidation reaction was continued at this temperature for 60 minutes. Starting from reaction time zero, 2 A dc was applied across the platinum electrode serving as anode and the autoclave body serving as a cathode. Also from reaction time zero, the valves 45 and 43 shown in FIG. 1 were operated at intervals of 15 minutes to collect a small amount of gaseous components and the reaction solution in the autoclaves.

FIG. 20 shows variation in TOC of the collected reaction solution. Acetic acid was effectively decomposed into carbon dioxide gas as demonstrated by a decrease in TOC with time.

In Example 34, the hypochlorite autodecomposes into an oxygen gas and NaCl during heating of the autoclave similarly to Comparative Example 13. When current supply is started across electrodes, however, NaCl and an oxygen gas are converted into a hypochlorite and hydrogen peroxide, respectively in the proximity of the electrodes. Oxidation reaction of organic matters effectively proceeds probably because these free chlorine and active oxygen serve as oxidizers.

What is claimed is:

1. A method for hydrothermal electrolysis, comprising a step of applying direct current, in a reactor which is not provided with a separation membrane between a cathode and an anode, to an aqueous medium containing water, a halide ion and a reduced matter at a temperature ranging from 100° C. to a critical temperature of the aqueous medium and under a pressure for maintaining the aqueous medium in the liquid phase.

2. The method of claim 1 wherein said aqueous medium is held in a reactor having a metallic inner wall serving as a cathode while an anode is placed in said reactor.

3. The method of claim 1 further comprising the step of adding an oxidizing agent to said aqueous medium.

4. The method of claim 3 wherein said oxidizing agent comprises at least one of the group consisting of an oxygen gas, ozone gas, hydrogen peroxide and hypohalous acids.

5. The method of claim 1 wherein said halide ion comprises chloride ion, bromide ion, iodide ion or any combination thereof.

6. The method of claim 1 wherein said aqueous medium contains 0.05 mmol/L or more of the halide ion.

7. The method of claim 1 wherein said reduced matter comprises a compound oxidized with OX$^-$ ion where X represents a chlorine atom, bromine atom, iodine atom or any combination thereof, or a compound oxidized with an oxidizing agent in the presence of water at a temperature ranging from 100° C. to a critical temperature of the aqueous medium.

8. The method of claim 1 wherein said reactor is substantially closed.

9. The method of claim 1, wherein the aqueous medium consists essentially of water, the halide ion and the reduced matter.

10. An apparatus for hydrothermal electrolysis, comprising:
a reactor being capable of withstanding a pressure of a hydrothermal reaction; and
a pair of electrodes for electrolyzing a matter in the reactor.

11. An apparatus for hydrothermal electrolysis of claim 10 wherein the pair of the electrodes serve as a cathode and an anode, respectively, the reactor has a metallic inner surface, the metallic inner surface is capable of serving as the cathode, and an electrode, which is capable for serving as the anode, is disposed in the reactor.

12. The apparatus of claim 11 wherein said anode has a surface having ruthenium, iridium, platinum, palladium, rhodium, tin or an oxide thereof or ferrite.

13. The apparatus of claim 10 further comprising a heating device for heating said reactor.

14. The apparatus of claim 10 wherein an aqueous medium line for feeding an aqueous medium to said reactor and a discharge line for discharging the aqueous medium hydrothermally electrolyzed from said reactor are connected to said reactor.

15. The apparatus of claim 14 comprising a heat exchanger connected to said aqueous medium line and said discharge line.

16. The apparatus of claim 14 wherein a gas-liquid separator is connected to said discharge line.

17. The apparatus of claim 14 wherein an oxidizing agent line for feeding an oxidizing agent to said reactor is connected to said reactor.

18. A method for hydrothermal electrolysis, comprising a step of applying direct current, in a reactor which is not provided with a separation membrane between a cathode and an anode, to an aqueous medium containing water, a strongly acidic ion and a reduced matter at a temperature ranging from 100° C. to a critical temperature of the aqueous medium and under a pressure for maintaining the aqueous medium in the liquid phase.

19. The method of claim 18 wherein said strongly acidic ion comprises halide ions, sulfate ion ($SO_4^{2-}$), nitrate ion ($NO_3^-$), phosphate ion ($PO_4^{3-}$) and trifluoroacetate ion ($CF_3COO^-$).

20. The method of claim 18, wherein the aqueous medium consists essentially of water, the strongly acidic ion and the reduced matter.

* * * * *